(12) United States Patent
Ide

(10) Patent No.: US 7,019,724 B2
(45) Date of Patent: Mar. 28, 2006

(54) LIQUID CRYSTAL OPTICAL SWITCH

(75) Inventor: Masafumi Ide, Saitama (JP)

(73) Assignee: Citizen Watch Co., Ltd., Tokyo (JP)

( * ) Notice: Subject to any disclaimer, the term of this patent is extended or adjusted under 35 U.S.C. 154(b) by 337 days.

(21) Appl. No.: 10/404,089

(22) Filed: Apr. 2, 2003

(65) Prior Publication Data
US 2003/0189538 A1 Oct. 9, 2003

(30) Foreign Application Priority Data
Apr. 4, 2002 (JP) ............................... 2002-102426

(51) Int. Cl.
*G09G 3/34* (2006.01)
(52) U.S. Cl. .......................................... 345/87; 345/58
(58) Field of Classification Search ................... 345/89, 345/147, 202, 153, 154, 58, 87, 697, 81; 349/117, 119, 121, 172, 100, 102; 359/159, 359/172, 180, 181; 385/39, 40, 129, 2
See application file for complete search history.

(56) References Cited

U.S. PATENT DOCUMENTS

| | | | | |
|---|---|---|---|---|
| 5,982,539 | A * | 11/1999 | Shirasaki | 359/484 |
| 6,097,461 | A * | 8/2000 | Sharp | 349/121 |
| 6,141,071 | A * | 10/2000 | Sharp | 349/121 |
| 6,356,578 | B1 * | 3/2002 | Yin | 372/107 |
| 6,594,063 | B1 * | 7/2003 | Bergner et al. | 359/251 |
| 6,600,582 | B1 * | 7/2003 | Liu et al. | 398/79 |
| 6,661,483 | B1 * | 12/2003 | Moriwaki et al. | 349/102 |
| 6,718,082 | B1 * | 4/2004 | Zhao et al. | 385/16 |
| 6,735,017 | B1 * | 5/2004 | Acosta et al. | 359/497 |

OTHER PUBLICATIONS

Y. Hakamata et al., "A1.3 μm Single-Mode 2×2 Liquid Crystal Optical Switch" IEICE Trans. Commun., Oct. 1994, vol. E77-B, No. 10, pp. 1249-1255.
P. Yeh et al., "Optics of Liquid Crystal Displays" Wiley, 1999, pp. 107-110, pp. 213-222.

* cited by examiner

*Primary Examiner*—Vijay Shankar
*Assistant Examiner*—Nitin Patel
(74) *Attorney, Agent, or Firm*—Westerman, Hattori, Daniels & Adrian, LLP

(57) ABSTRACT

The present invention, which relates to a polarization control liquid crystal optical switch for optical communication and its drive method, may be applied to the wavelength division multiplexing (WDM) communication method and an optical network using optical fibers. The liquid crystal optical switch comprises a liquid crystal polarizing rotator including at least one polarization control liquid crystal cell, wherein, at polarization rotation operation time, the liquid crystal polarizing rotator acts as a half-wave plate for linearly polarized light with a predetermined wavelength which enters the liquid crystal polarizing rotator. The polarization control liquid crystal cell has a function that varies a center wavelength to be used when the polarization control liquid crystal cell acts as the half-wave plate, and a function that maximizes a cross-talk attenuation.

9 Claims, 9 Drawing Sheets

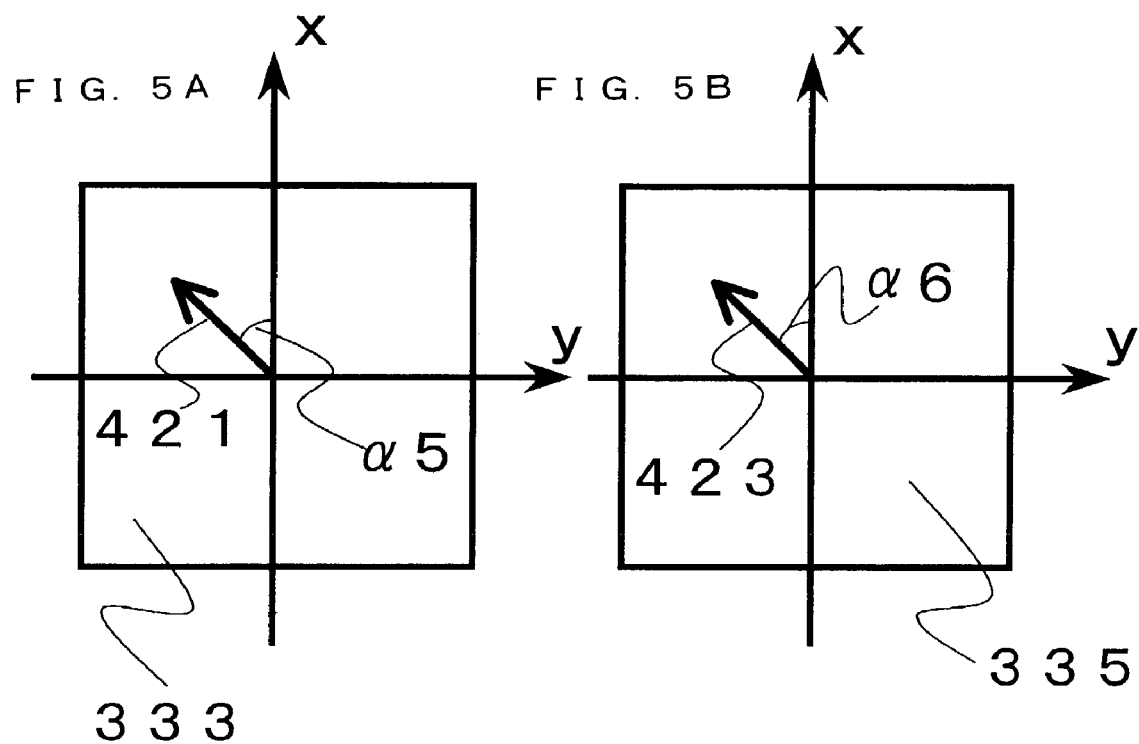

LIQUID CRYSTAL OPTICAL SWITCH

BACKGROUND OF THE INVENTION

1. Field of the Invention

The present invention relates to a polarization control liquid crystal optical switch for use in optical communication and its drive method, and more particularly to a polarization control liquid crystal optical switch for use in a wavelength division multiplexing (WDM) communication method and an optical network using optical fibers.

2. Description of the Prior Art

A polarization control optical modulator using a nematic liquid crystal has been practically used in a liquid crystal display. An example of a polarizing rotator used in a polarization control optical modulator is a 90° twisted nematic (TN) liquid crystal. Although a TN liquid crystal cell is basically suitable for a high contrast ratio and a large cross-talk attenuation, its cell thickness is proportional to the square of the response speed, meaning that a higher response requires a thinner liquid crystal cell. Because the Mauguin condition does not satisfy the condition that $\lambda/2$ must be sufficiently small with respect to $\Delta n \cdot d$ (where, $\lambda$ is a wavelength, $\Delta n$ is a refractive index anisotropy of liquid crystal, and d is the thickness of a liquid crystal cell), the wave-guide effect diminishes. As a result, the contras ratio deteriorates. To solve this problem, today's high response TN display, a typical application of the TN liquid crystal, usually creates cells by setting up cell parameters that satisfy the first (hereinafter called 1st) minimum condition which is a term used for the normally black mode of a liquid crystal display and in which the Muaguin parameter u of the expression $$d=(\lambda/2)\cdot(u/\Delta n)$$

is set to the square root of 3.

An example of applying the TN liquid crystal, which uses the 1st minimum condition, to a 2×2 switch for use in optical fiber communication is described, for example, in "A1.3 μm Single-Mode 2×2 Liquid Crystal Optical Switch", Y. Hakamata, T. Yoshizawa and T. Kodaira, IEICE Trans. Commun., Vol. E77-B, No. 10, October 1994.

This book describes a 2×2 switch that has an input/output unit for converting light from a single mode optical fiber to parallel rays with a collimator and has a TN liquid crystal held between two prisms, each formed by integrating a polarizing splitter and a total reflection mirror, and designed to satisfy the 1st minimum condition in the wavelength of 1.3 μm band.

However, as shown in the book described above, the wavelength used for optical fiber communication is in the near-infrared region. Unlike a wavelength used in the visible region used for a display (for example, 550 nm for green), a wavelength in the 1300 nm band or the 1550 nm band is usually used for optical fiber communication.

Therefore, a long wavelength used in the cell results in the cell thickness d being increased. This produces a problem that a conventional TN liquid crystal cell, if used for a polarization control optical switch for optical fiber communication, slows the response time. For example, the specifications for a synchronous optical network (SONET) and a synchronous digital hierarchy (SDH) define that the time to recover from a network failure be within 50 milliseconds. Considering the future evolution of optical network systems, compatibility with conventional networks is important and so the optical switch response time must be at least 50 milliseconds or shorter. For those polarization control optical modulators conforming to the specifications, the conventional TN liquid crystal cannot be used for a liquid crystal switch without change. The details will be described below.

First, consider that the polarizing rotator of an optical switch is implemented using the TN liquid crystal technology. For the center wavelength of 1550 nm usually used for optical fiber communication, the liquid crystal cell thickness d satisfying the 1st minimum condition is about 15 μm when the liquid crystal ZLI-4792 (trademark of MERCK JAPAN Ltd.) and when $\Delta n$ (refractive index anisotropy of liquid crystal) is 0.09. At this time, the turn-on response time $\tau r$ is in inverse proportion to the square of the magnitude of the electric field applied to the liquid crystal cell. Therefore, the response time of 50 milliseconds or shorter may be attained by increasing the voltage even if the cell is thick. However, the turn-off response time $\tau d$ is 150 milliseconds or longer at a temperature near the room temperature because the response time is in direct proportion to the square of the liquid crystal cell thickness. Thus, a liquid crystal cell having the conventional configuration cannot be practically used directly as an optical switch used for optical communication.

Consider that a polarizing rotator is implemented by an optical switch in which a liquid crystal cell is used as the 0th-degree half-wave plate. In this case, because an anti-parallel orientation or parallel orientation liquid crystal cell is used as the half-wave plate, the cell thickness is as follows:

$$d=\lambda/(2\cdot\Delta n)$$

Here, if $\Delta n$ of the ZLI-4792 is 0.09 and the center wavelength $\lambda$ is 1550 nm, the cell thickness d is about 8.6 μm. In this case, when the response time is compared with that obtained when a TN liquid crystal cell is used, the turn-off response time $\tau d$ is about 60 milliseconds, that is, about three times as higher. However, the problem is that the wavelength bandwidth in which the cross-talk attenuation increases becomes narrowed.

OBJECT AND SUMMARY OF THE INVENTION

It is an object of the present invention to provide a method for configuring a polarization control liquid crystal optical switch that solves the above problems, that is applicable to optical fiber communication, that has a simple structure, that features high speed and broad band, and that is applicable also to an optical attenuator.

To achieve the above objects, the present invention basically uses the technology configuration described below.

A first means is a liquid crystal optical switch that comprises a liquid crystal polarizing rotator including at least one polarization control liquid crystal cell, and that, at polarization rotation operation time, acts as a half-wave plate for linearly polarized light with a predetermined wavelength which enters the liquid crystal polarizing rotator, wherein the liquid crystal polarizing rotator has a function that varies a center wavelength to be used when the polarization control liquid crystal cell acts as the half-wave plate, and a function that maximizes a cross-talk attenuation.

A second means is the liquid crystal optical switch, wherein the polarization control liquid crystal cell is a cell in which a liquid crystal layer held between a pair of plates is in either anti-parallel or parallel orientation.

A third means is the liquid crystal optical switch, wherein the liquid crystal polarizing rotator comprises at least one polarization control liquid crystal cell; and at least one residual double refraction compensation means placed in an optical path passing through the polarization control liquid crystal cell to maximize the cross-talk attenuation.

A fourth means is the liquid crystal optical switch, wherein the residual double refraction compensation means is a residual double refraction compensation liquid crystal cell in which a liquid crystal layer held between a pair of plates is in either anti-parallel or parallel orientation and wherein an azimuthal angle of a liquid crystal director of the residual double refraction compensation liquid crystal cell is almost perpendicular to an azimuthal angle of a liquid crystal director of the polarization control liquid crystal cell.

A fifth means is the liquid crystal optical switch, wherein the residual double refraction compensation means is a residual double refraction compensation wave plate made of a crystal plate or an anisotropy film and wherein the c-axis of the residual double refraction compensation wave plate is perpendicular to a director of the polarization control liquid crystal cell.

A sixth means is an optical liquid crystal switch comprising a liquid crystal polarizing rotator including at least one polarization control liquid crystal cell; a voltage application unit applying a voltage to the polarization control liquid crystal cell; and a controller controlling a voltage to be applied. The controller controls the voltage to be applied to the polarization control liquid crystal cell to change a retardation of the liquid crystal polarizing rotator for rotating a polarization of light with a predetermined wavelength that enters the liquid crystal polarizing rotator.

A seventh means is the optical liquid crystal switch, wherein the controller applies the voltage so that the retardation satisfies a half-wave plate condition for operating the liquid crystal polarizing rotator as a half-wave plate.

An eighth means is the optical liquid crystal switch, wherein the controller varies a center wavelength by shifting the voltage at which the retardation satisfies the half-wave plate condition.

A ninth means is the optical liquid crystal switch, wherein the controller applies the voltage at which the retardation satisfies the half-wave plate condition for maximizing a cross talk attenuation of linearly polarized light passing through the liquid crystal polarizing rotator.

The liquid crystal polarizing rotator of the polarization control liquid crystal optical switch according to the present invention has ideally two or more polarization control liquid crystal cells, in either the anti-parallel or parallel orientation in the same optical axis direction, in multiple stages and ideally has one or more residual double refraction compensation wave plate or liquid crystal cell, which compensates for the phase, in the optical path.

The first to kth of the plurality of polarization control liquid crystal cells each have an equal Δn. When the azimuthal angle of the director of the liquid crystal next to the light incident plate of the first polarization control liquid crystal cell of the plurality of polarization control liquid crystal cells that is nearest to the light incident side is used as the base azimuthal angle, the ith polarization control liquid crystal cell is arranged such that the azimuthal angle of the liquid crystal next to the light incident side plate of the ith polarization control liquid crystal cell is almost equal to the azimuthal angle of liquid crystal next to the light outgoing side plate of the (i−1)th polarization control liquid crystal cell.

The residual double refraction compensation liquid crystal cell, when used, is arranged such that the director of the residual double refraction compensation liquid crystal cell is almost perpendicular to the director of the polarization control liquid crystal cell and such that the liquid crystal layer of that cell is either in the anti-parallel or parallel orientation. The polarization control liquid crystal cell and the residual double refraction compensation liquid crystal cell may be in the same orientation, either anti-parallel or parallel, or in different orientations.

First, the cell thickness d of a polarization control liquid crystal cell applicable to the present invention, where the liquid crystal polarizing rotator is configured, for example, by a transparent liquid crystal cell, will be described. For an anti-parallel orientation or parallel orientation liquid crystal element, it is well known that the cell thickness condition is as described below when a polarization control liquid crystal cell is used as a half-wave plate that can be used for switching at a predetermined wavelength λ:

$$d=\lambda/(2\cdot\Delta n) \qquad (1)$$

where d is the total cell thickness of polarization control liquid crystal cells, Δn is a refractive index anisotropy when no electric field is applied, and λ is the wavelength.

However, the structure according to the present invention allows a residual double refraction compensation liquid crystal cell to be inserted in an optical path of an optical switch as described above. In this case, a liquid crystal polarizing rotator, which is a compound element composed of the polarization control liquid crystal cell and the residual double refraction compensation liquid crystal cell, is required to work as a half-wave plate. Therefore, the compound retardation $\Delta n_t \cdot d_t$ of the liquid crystal polarizing rotator must satisfy the condition $$\Delta n_t \cdot d_t = \Delta n \cdot d - \Delta n_c \cdot d_c \qquad (2)$$
$$= \lambda/2$$

where, Δn·d is the retardation of the polarization control liquid crystal cell and $\Delta n_c \cdot d_c$ is the retardation of the residual double refraction compensation liquid crystal cell. From this expression, it is desirable that the cell thickness d of the polarization control liquid crystal cell be set to satisfy the following:

$$d=\lambda/(2\cdot\Delta n(V_1))+(\Delta n_c/\Delta n(V_1))d_c \qquad (3)$$

where $\Delta n_c$ is the double refractive index at compensation operation time when the compensation voltage $V_c$ is applied to the residual double refraction compensation liquid crystal cell, and $d_c$ is the thickness of the residual double refraction compensation liquid crystal cell. $\Delta_n(V_1)$ indicates the effective double refractive index when the voltage $V_1$ is applied to the polarization control liquid crystal cell. In expressions (2) and (3), $\Delta n_c$ is always a positive value because the double refractive index of the residual double refraction compensation liquid crystal cell at compensation operation time is a value generated by subtracting the refractive index on the ordinary axis from the refractive index on the extraordinary axis.

The following describes the operation of a plurality of multistage polarization control liquid crystal cells that satisfy expression (2) described above and all of which have an equal director azimuthal angle.

When a low bias voltage $V_1$ is applied to the electrodes of the polarization control liquid crystal cells, the liquid crystal optical switch according to the present invention optically becomes equivalent to a half-wave plate condition. Therefore, incident linearly polarized light with a predetermined wavelength, which has the azimuthal angle tilted π/4 or an odd multiple of π/4 from the azimuthal angle of the director in the light incident side of the first polarization control liquid crystal cell, does not become elliptically polarized light in the outgoing side of the kth polarization control liquid crystal cell; instead, the light has its azimuthal angle rotated π/2 radian with respect to the azimuthal angle of the incident linearly polarized light.

On the other hand, when a predetermined high bias voltage $V_2$ is applied to the first to kth polarization control liquid crystal cells, the retardation of the polarization control liquid crystal cells is reduced and, in addition, the residual double refraction compensation liquid crystal cell almost eliminates the residual double refraction components of the polarization control liquid crystal cells. Therefore, incident linearly polarized light may exit from the kth polarization control liquid crystal cell with its azimuthal angle unrotated.

Therefore, with a polarization beam splitter or a polarization beam separator of double refraction crystal provided in the light outgoing side and with the voltages $V_1$ and $V_2$ controlled as described above, the polarization control liquid crystal optical switch of the present invention can be used as an optical switch because it is able to change the direction into which incident linearly polarized light is to travel and vary the outgoing light intensity in a predetermined outgoing direction.

Next, the response time of the liquid crystal optical switch according to the present invention will be described. For the sake of simplicity, consider the polarization control liquid crystal optical switch according to the present invention in which the liquid crystal polarizing rotator is composed of two polarization control liquid crystal cells, both of which have an equal thickness, and a residual double refraction compensation liquid crystal cell and in which the compound retardation ($\Delta n_r \cdot d_r$) becomes the half-wave plate condition.

In a conventional half-wave plate liquid crystal cell composed of one polarization control liquid crystal cell, the cell thickness d is expressed by expression (1) given below.

$$d = \lambda/(2 \cdot \Delta n)$$

For the polarization control liquid crystal optical switch according to the present invention in which the liquid crystal polarizing rotator is composed of two polarization control liquid crystal cells each with about ¼-wave plate condition, the thickness of one cell is about d/2 because the cell thickness d maybe divided into two polarization control liquid crystal cells.

In a liquid crystal cell satisfying the anti-parallel or parallel orientation half-wave plate condition, it is known that the turn-on response time τr when the electric field is applied to the liquid crystal cell to which no electric field has been applied is approximately as follows.

τr is proportional to $(d/V)^2$.

where V is the voltage applied. Also, it is known that the turn-off response time (τd) when the electric field is removed from the liquid crystal cell to which the electric field has been applied is approximately as follows.

τd is proportional to $d^2$.

For example, when the liquid crystal polarizing rotator of the present invention is a polarization control liquid crystal optical switch composed of two polarization control liquid crystal cells, each satisfying the approximate ¼-wave plate condition, and one residual double refraction compensation liquid crystal cell, the comparison with the optical switch in the prior art, which is made of the same liquid crystal material as that of the optical switch of the present invention, indicates that each of the response times shown above is about four times as fast. An increase in the number of divisions in the thickness direction for reducing the thickness of each cell could increase the speed. As a result, it is possible to reduce both the turn-on response time τr and the turn-off response-time τd to 20 milliseconds or shorter, which would not be attained by the configuration in the prior art.

In addition, with the use of the residual double refraction compensation wave plate or the residual double refraction compensation liquid crystal cell inserted in the optical path, the liquid crystal rotator of the liquid crystal switch of the present invention is able to equivalently reduce its retardation to 0 and to reduce residual double refraction components that remain when a voltage is applied to the polarization control liquid crystal cell. This may reduce the cross-talk attenuation in the optical switch.

When parallel orientation cells, such as anti-parallel orientation cells or parallel orientation cells, are used for the polarization control liquid crystal cells of the liquid crystal polarizing rotator, the liquid crystal cells are considered to be equivalent to uniaxial optical crystals having a crystal axis approximately parallel to the liquid crystal cells. Now, consider the effective double refractive index Δn.

First, when a liquid crystal layer is considered a stack of a plurality of slabs, the local effective extraordinary index $\delta n_{\textit{eff}}$ of a slab is as follows:

$$\delta n_{\textit{eff}} = (\sin^2 \theta / no^2 + \cos^2 \theta / ne^2)^{-1/2}$$

where ne is the extraordinary index and no is the ordinary index of liquid crystal material used, and θ is the local tilt angle of the liquid crystal.

Because the local effective extraordinary index $\delta n_{\textit{eff}}$ in an actual liquid crystal cell is the function of a voltage-applied electric field and a cell thickness direction, the effective extraordinary index $\delta n_{\textit{eff}}(V)$ of one liquid crystal cell in its entirety is the value of the expression given below that calculates the integral of the expression given above at a predetermined voltage V from 0 to d in the cell thickness direction, where d is the liquid crystal thickness.

$$n_{\textit{eff}}(V) = \int \delta n_{\textit{eff}} dz \, (\int \text{ from } z=0 \text{ to } d)$$

Therefore, the effective double refractive index Δn formed by the parallel orientation cells is the function of the voltage, which is expressed as follows:

$$\Delta n(V) = n_{\textit{eff}}(V) - n_o$$

At this time, if a value almost satisfying the half-wave plate condition at a predetermined voltage to be applied is selected for the liquid crystal cell thickness, the effective double refractive index may be controlled by the applied voltage so that the predetermined half wave condition is satisfied. When the half wave condition $$\lambda/2 = \Delta n \cdot d$$

is satisfied, lineally polarized light with the wave length λ that enters the liquid crystal polarization control rotator enters the linearly polarized state after exiting from the liquid crystal polarization control rotator, thus maximizing the cross-talk attenuation. Therefore, optimally designing the half-wave plate condition by controlling the voltage to be applied according to the wavelength expands the available bandwidth of an apparent optical switch.

As is apparent from the above description, the liquid crystal optical switch according to the present invention may be used to implement high-speed, broadband, and highly functional optical switches and variable optical attenuators using a simple structure and an easy-to-use drive method. Although it is an object of the present invention to provide a polarization control liquid crystal optical switch for use in wavelength division multiplexing (WDM) and optical networks using optical fibers, the scope of the present invention is not limited to this. The present invention is also applicable, for example, to a liquid crystal optical modulator for use on free space optical communication units.

BRIEF DESCRIPTION OF THE DRAWINGS

The foregoing and other objects and features of the invention will become apparent from the following description of preferred embodiments of the invention with reference to the accompanying drawings, in which:

FIG. 5 is a plan view showing the azimuthal angles of the liquid crystal directors in the plate interfaces of a residual double refraction compensation liquid crystal cell of the liquid crystal polarizing rotator of the polarization control liquid crystal optical switch in the embodiments of the present invention;

DETAILED DESCRIPTION OF THE PREFERRED EMBODIMENTS

With reference to the drawings, the configuration and the drive method of a liquid crystal optical switch in a best mode for carrying out the present invention will be described below.

Figure 2:
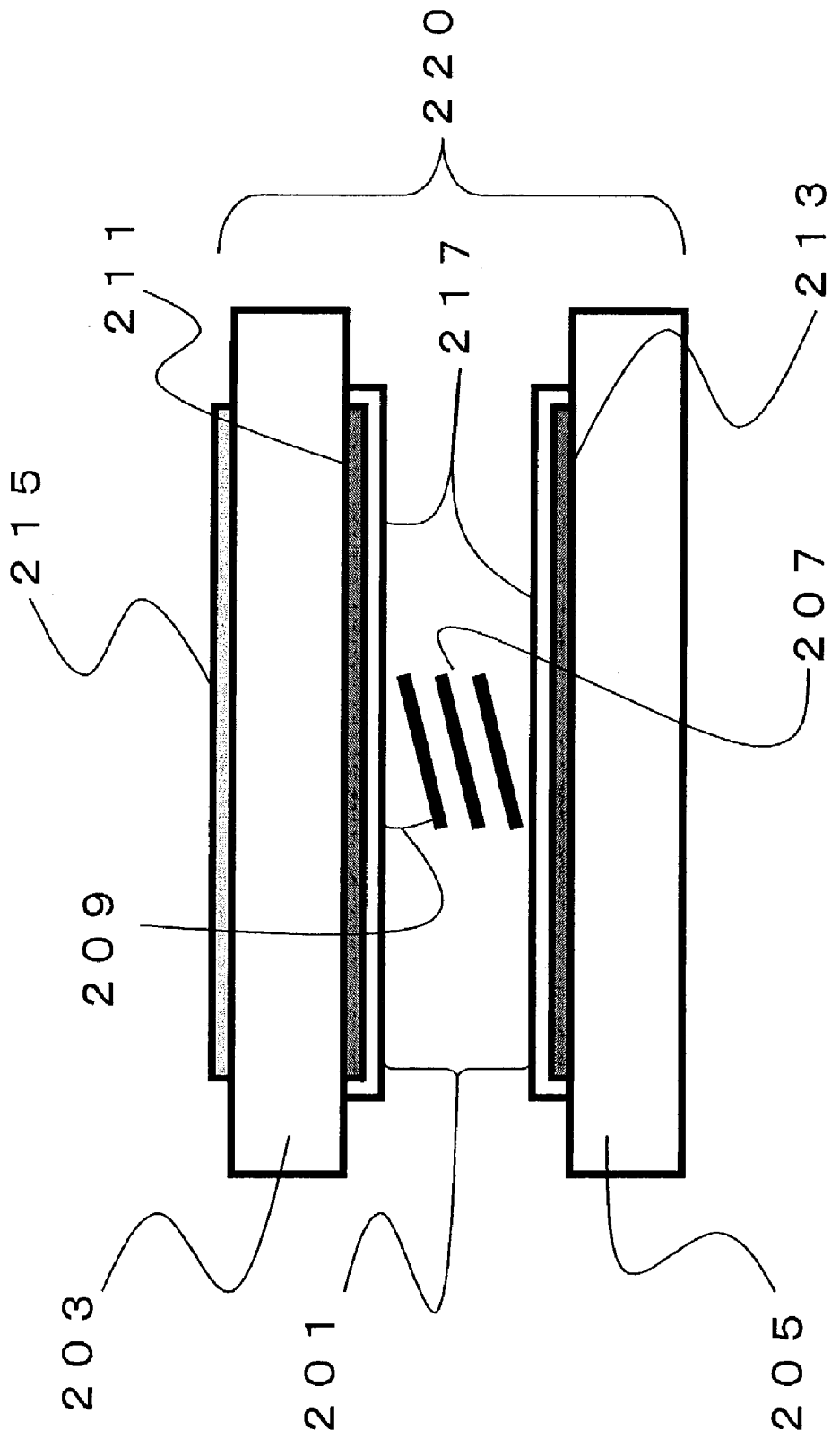
FIG. 2 is a cross sectional diagram schematically showing the structure of a liquid crystal cell used to build a liquid crystal polarizing rotator of the polarization control liquid crystal optical switch in the embodiment of the present invention.

First, the configuration of a liquid crystal optical switch in an embodiment of the present invention will be described by referring to the drawings. FIG. 2 is a structural cross sectional diagram showing a liquid crystal cell 220 that constitutes the liquid crystal optical switch in the embodiment of the present invention.

As shown in FIG. 2, the liquid crystal cell 220, used for polarization control and residual double refraction compensation of the liquid crystal control optical switch of the present invention, is configured by holding a nematic liquid crystal layer 201 between a first plate 203 on which a signal electrode 211 is formed and a second plate 205 on which a common electrode 213 is formed. This nematic liquid crystal layer 201 is in the anti-parallel orientation such that a pre-tilt angle 209 of a director 207 of positive (p) liquid crystal molecules when no electric field is applied is maintained between 0.5 degrees to 20 degrees by orientation layers 217 formed on the signal electrode 211 on the first plate 203 and formed on the common electrode 213 on the second plate 205. Note that the orientation layer 217 is formed by polyimide and that the liquid crystal molecules are oriented toward a predetermined direction by the rubbing method. Although anti-parallel orientation is shown in FIG. 2, the director 207 may also be in the parallel orientation.

Although not shown explicitly in FIG. 2, the peripheral part of the liquid crystal cell 220 is solidified via a spacer and using a sealing material so that the first plate 203 and the second plate 205 allows the nematic liquid crystal layer 201 to maintain a predetermined thickness of several μm. Also, though not shown in FIG. 2, a transparent insulating film of tantalum pentoxide ($Ta_2O_5$) or silicon dioxide ($SiO_2$) may be formed on the signal electrode 211 and/or the common electrode 213 and under the orientation layer 217 in order to prevent a short between the signal electrode 211 and the common electrode 213.

The signal electrode 211 created on the first plate 203 and the common electrode 213 created on the second plate 205 form a predetermined pattern of a transparent conducting film as necessary, for example, for forming an array.

When indium tin oxide (ITO) is used as the transparent conducting film, it is desirable that the film be 50 nm or thinner and that, to increase transparency in the near-infrared region, the film has a sheet resistance of several hundred Ω to 1 kΩ having a high oxygen density at film forming time. The reason is that a low resistance ITO is usually transparent in the visible light region but that, in the near-infrared region, the frequency of incident light is smaller than the plasma frequency of a low resistant ITO and therefore the film has the refractive characteristics similar to those of metal. In this embodiment, a high oxygen density, high resistance ITO is used that can reduce the reflectivity in the near-infrared region by the amount of reduction in carrier density. In addition to ITO, an indium oxide ($In_2O_3$), tin oxide ($SnO_2$), or zinc oxide (ZnO) thin film may also be used as the transparent conducting film. Again, it is desirable that the film be 50 nm or thinner and that the sheet resistance of the film be several hundred Ω to 1 KΩ.

In addition, to prevent reflection in the interface between air and the plate, an antireflection coating 215 is formed as necessary on the surface, opposite to the nematic liquid crystal layer 201, of the first plate 203 and the second plate 205 both of which are made of glass. Although formed only on the first plate 203 in FIG. 2, the antireflection coating 215 may also be formed under the second plate 205 as necessary.

Figure 3:
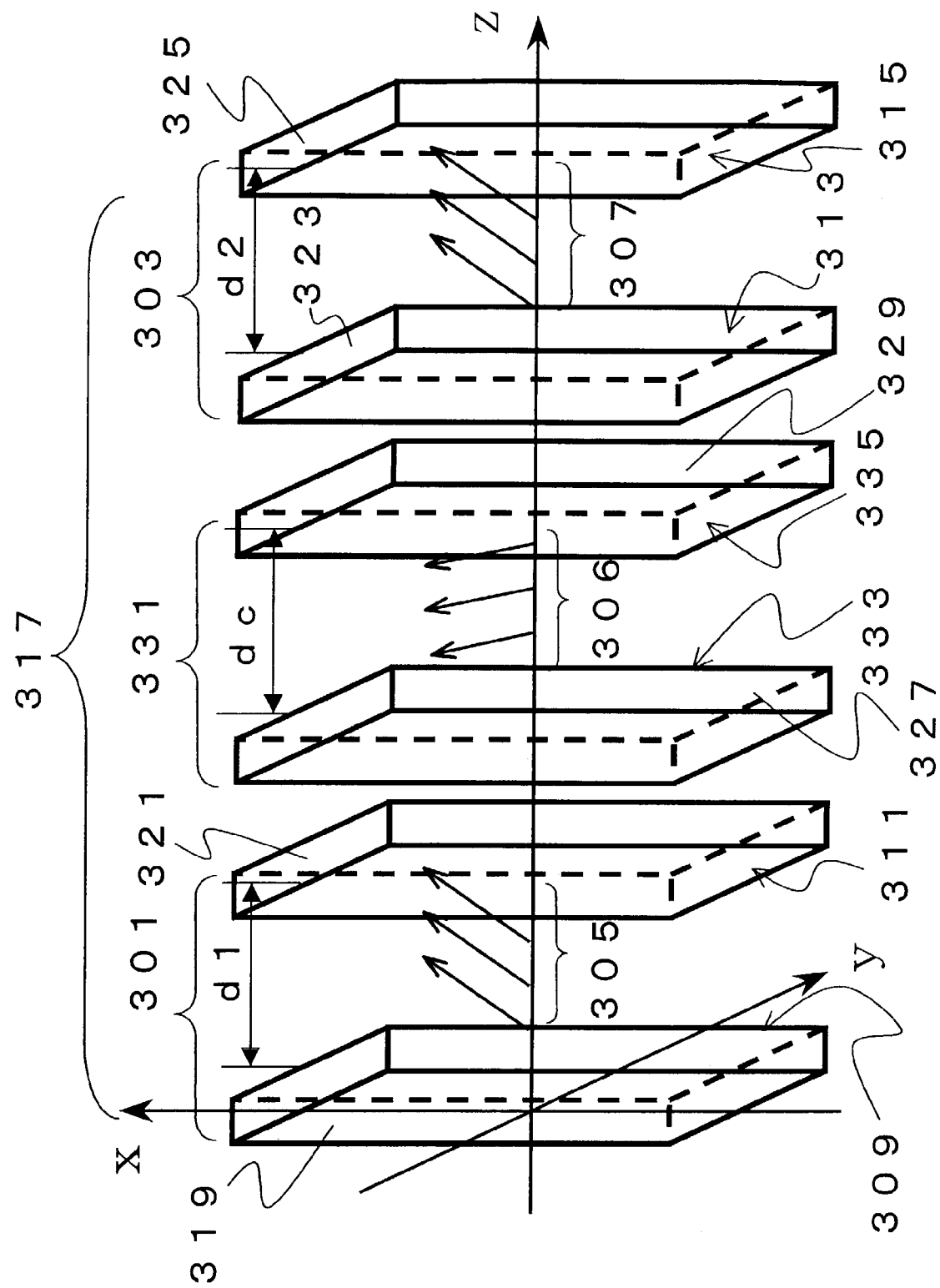
FIG. 3 is a diagram schematically showing the structure of the liquid crystal polarizing rotator of the polarization control liquid crystal optical switch in the embodiment of the present invention.

Next, with reference to FIGS. 3 and 4, the polarization control liquid crystal cells used for the liquid crystal polarizing rotator of the present invention, composed of two-stage anti-parallel orientation liquid crystal cells that are equal in cell thickness and in pre-tilt angle, will be described. FIG. 3 is a diagram schematically showing a liquid crystal polarizing rotator 317 composed of a first polarization control liquid crystal cell 301, a second polarization control liquid crystal cell 303, and a residual double refraction compensation liquid crystal cell 331.

Referring to FIG. 3, the first polarization control liquid crystal cell 301 has the structure in which a first liquid crystal layer 305 is held between a first glass plate 319 and a second glass plate 321. The second polarization control liquid crystal cell 303 has the structure in which a second liquid crystal layer 307 is held between a third glass plate 323 and a fourth glass plate 325.

The first cell thickness $d_1$ of the first liquid crystal cell 301 is made equal to the second cell thickness $d_2$ of the second liquid crystal cell 303. In addition, the residual double refraction compensation liquid crystal cell 331 is placed between the first liquid crystal cell 301 and the second liquid crystal cell 303. The residual double refraction compensation liquid crystal cell 331 has the structure in which a third liquid crystal layer 306 is held between a fifth glass plate 327 and a sixth glass plate 329.

The residual double refraction compensation liquid crystal cell 331, which is placed between the first polarization control liquid crystal cell 301 and the second polarization control liquid crystal cell 303 in this embodiment, may be placed anywhere in the optical path of the liquid crystal polarizing rotator 317, for example, immediately before the first polarization control liquid crystal cell 301 or immediately after the second polarization control liquid crystal cell 303. Although not explicitly shown in FIG. 3, the first polarization control liquid crystal cell 301, second polarization control liquid crystal cell 303, and residual double refraction compensation liquid crystal cell 331 each have the same structure as that of the liquid crystal cell 220 shown in FIG. 2.

The arrows in the first liquid crystal layer 305, second liquid crystal layer 307, and third liquid crystal layer 306 in FIG. 3, which show the orientation state of the liquid crystal molecules, schematically show liquid crystal directors. Here, in the first polarization control liquid crystal cell 301, the interface between the first glass plate 319 and the first liquid crystal layer 305 is a first interface 309 and, similarly, the interface between the second glass plate 321 and the first liquid crystal layer 305 is a second interface 311. In addition, in the second polarization control liquid crystal cell 303, the interface between the third glass plate 323 and the second liquid crystal layer 307 is a third interface 313, and the interface between the fourth glass plate 325 and the second liquid crystal layer 307 is a fourth interface 315. In addition, in the residual double refraction compensation liquid crystal cell 331, the interface between the fifth glass plate 327 and the third liquid crystal layer 306 is a fifth interface 333, and the interface between the sixth glass plate 329 and the third liquid crystal layer 306 is a sixth interface 335.

In the description below, with the clockwise direction from the x-axis positive direction to the y-axis positive direction in the x-y-z coordinate system defined as a positive azimuthal angle, the azimuthal angle of the liquid crystal director in the side of the first interface 309 of the first polarization control liquid crystal cell 301 is set to π/4 radian and the thickness direction is set in the direction parallel to the z-axis.

Next, the directions of the liquid crystal directors in the interfaces 309, 311, 333, 335, 313, and 315 are shown in the plan charts in FIGS. 4A–4F. Referring to FIGS. 3 and 4 as necessary, the configuration will be described below.

Figure 4A:
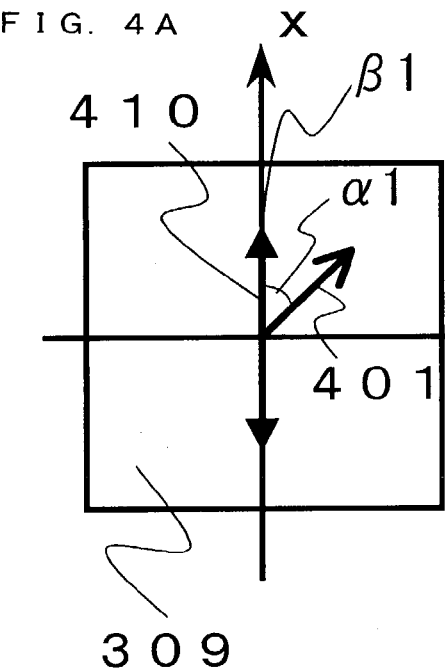
FIG. 4 is a plan view showing the azimuthal angles of the liquid crystal directors in the plate interfaces of the polarization control liquid crystal cells of the liquid crystal polarization control rotator of the polarization control liquid crystal optical switch in the embodiments of the present invention.
Figure 4B:
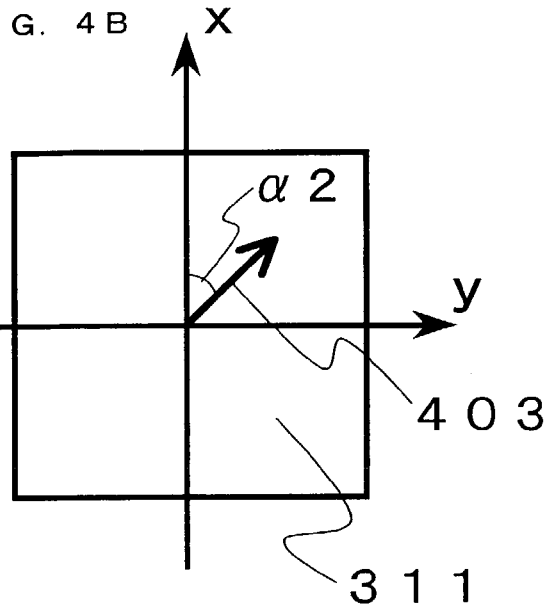
Figure 4C:
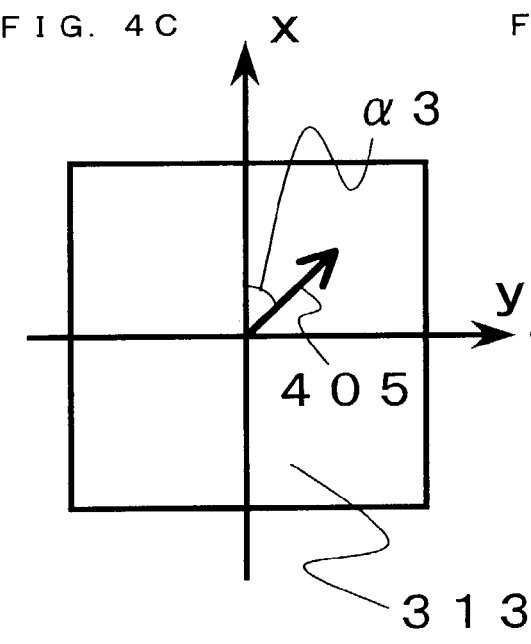

In the first interface 309 shown in FIG. 4A, assume that the azimuthal angle α1 of a first liquid crystal director 401 measured from the x-axis is π/4 radian. Because the first polarization control liquid crystal cell 301 shown in FIG. 3 is in the anti-parallel orientation, the azimuthal angle α2 of a second liquid crystal director 403 is also π/4 radian in the second interface 311 shown in FIG. 4B. Next, the azimuthal angle α3 of a third liquid crystal director 405 in the third interface 313 in FIG. 4C is π/4 radian to make the third liquid crystal director 405 parallel to the second liquid crystal director 403. Because the second polarization control liquid crystal cell 303 is also in the anti-parallel orientation as shown in FIG. 3, the azimuthal angle α4 of a fourth liquid crystal director 407 in the fourth interface 315 in FIG. 4D is π/4 radian.

In addition, as shown in FIG. 5A, the azimuthal angle α5 is −π/4 radian with respect to the x-axis to make the fifth liquid crystal director 421 in the fifth interface 333 perpendicular to the neighboring second liquid crystal director 403. Because the residual double refraction compensation liquid crystal cell 331 is also in the anti-parallel orientation as shown in FIG. 3, the azimuthal angle α6 of a sixth liquid crystal director 423 in the sixth interface 335 in FIG. 5B is −π/4 radian.

Figure 4D:
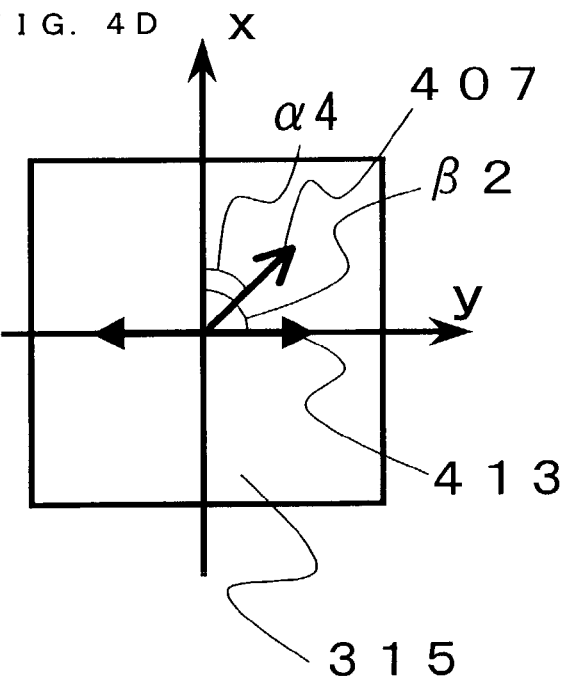

In this configuration, applying a low voltage $V_1$ to the polarization control liquid crystal cells 301 and 303 of the liquid crystal panel and applying a predetermined voltage $V_c$ to the residual double refraction compensation liquid crystal cell 331 rotate the azimuthal angle of an incident linearly polarized light 410 by π/2 radian as indicated by the outgoing linearly polarized light 413 shown in FIG. 4D. It is also understood that applying a high voltage $V_2$ to the polarization control liquid crystal cells 301 and 303 of the liquid crystal panel and applying a predetermined voltage $V_c$ to the residual double refraction compensation liquid crystal cell 331 emit light without rotating the azimuthal angle.

In the above description, though composed of two polarization control liquid crystal cells 301 and 303 and one residual double refraction compensation liquid crystal cell 331 all with the same thickness, the liquid crystal polarizing rotator 317 of the present invention may be composed of k (three or more) polarization control liquid crystal cells. In this case, the total cell thickness d is expressed as follows:

$$d = d_1 + d_2 + \ldots d_k \quad (4)$$

where $d_1$ is the thickness of the first cell and $d_k$ is the thickness of the kth cell. Let $n_e$ be the extraordinary index of a liquid crystal material used, $n_o$ be the ordinary index, and θ be the tilt angle of the liquid crystal. Then, the local effective extraordinary index $\delta n_{eff}$ is expressed as follows:

$$\delta n_{eff} = (\sin^2 \theta / n_o^2 + \cos^2 \theta / ne^2)^{-1/2} \quad (5)$$

Because the local effective extraordinary index $\delta n_{eff}$ in an actual liquid crystal cell is the function of a voltage-applied electric field and a cell thickness the effective extraordinary index $n_{eff}(V)$ of one liquid crystal cell in its entirety is the value of the expression (6) given below that calculates the integral of expression (5) at a predetermined voltage V from 0 to d in the cell thickness direction, where d is the liquid crystal thickness.

$$n_{eff}(V) = \int \delta n_{eff} dz \ (\int \text{from } z=0 \text{ to } d) \quad (6)$$

The effective double refractive index Δn(V) of the polarization control liquid crystal cells in the liquid crystal optical switch according to the present invention, which is the function of the voltage, may be expressed as follows:

$$\Delta n(V) = n_{eff}(V) - n_o \quad (7)$$

Therefore, the total cell thickness $d_t$ composed of three or more liquid crystal cells at a predetermined wavelength λ satisfies expression (3) given above.

$$d_t = \lambda/(2 \cdot \Delta n(V_1)) + (\Delta n_c/\Delta n(V_1))d_c$$

where, $\Delta n_c$ is the double refractive index of the residual double refraction compensation liquid crystal cell at compensation operation time and $d_c$ is the thickness of the residual double refraction compensation liquid crystal cell.

If the liquid crystal polarizing rotator satisfies the condition specified by expression (3) when the low voltage $V_1$ is applied to the polarization control liquid crystal cells and a predetermined voltage $V_c$ is applied to the residual double refraction compensation liquid crystal cell, the liquid crystal polarizing rotator becomes equivalent to a 0th half-wave plate, fabricated by optical crystal such as crystal, as is well known in the field of optics. (Reference: Pochi Yeh and Claire Gu, Optics of Liquid Crystal Displays, Wiley, 1999).

As with a liquid crystal polarizing rotator composed of two polarization control liquid crystal cells, the azimuthal angle $\alpha_k$ of the liquid crystal directors in the first to $2_k$th interfaces must be equal to the azimuthal angle $\alpha_1$ of the first liquid crystal director. For example, the azimuthal angles are set as follows:

If $\alpha_1 = /\pi 4$ radian, then $\alpha_1 = \alpha_2$ $\alpha_2 = \alpha_3$

. . .

$\alpha_{2k-2} = \alpha_{2k}$

As described above, when expression (3) is satisfied and when almost the same azimuthal angle is used for the directors of three or more polarization control liquid crystal cells, the present invention may be applied to a polarization control liquid crystal optical switch composed of three or more polarization control liquid crystal cells as with a liquid crystal polarizing rotator composed of two polarization control liquid crystal cells. As is described in the summary of the invention, the configuration used in the present invention reduces the response time by making a cell thinner even if three or more polarization control liquid crystal cells are used. When a liquid crystal polarizing rotator according to the present invention is configured by n polarization control liquid crystal cells considering the response speed, the mode in which the retardation of the polarization control liquid crystal cells is about ½n wavelength is best.

Next, the actual configuration of the liquid crystal polarizing rotator according to the present invention will be described in detail. Referring to FIG. 3, the total cell thickness $d_t$ of the polarization control liquid crystal cells constituting the liquid crystal polarizing rotator 317 may be thought of as the thickness $d_0$ of the cells that function as a half-wave plate plus the thickness $d_{cp}$ of the compensation cell that compensates for a residual double refraction compensation crystal cell. As with expression (3) described above, the total thickness is expressed as follows:

$$d_t = d_0 + d_{cp}$$
$$= \lambda/(2 \cdot \Delta n(V_1)) + (\Delta n_c/\Delta n(V_1))d_c$$

The residual double refraction compensation liquid crystal cell 331 is only required to equivalently cancel residual double refraction components that remain when a predetermined voltage is applied to the polarization control liquid crystal cells 301 and 303. The following describes an example of design in which a voltage with the retardation Δnc·dc of a 1/14 wavelength is applied to the residual double refraction compensation liquid crystal cell 331.

First, assume that two polarization control liquid crystal cells and one residual double refraction compensation liquid crystal cell are used. Those liquid crystal cells have the same thickness d. As described above, the apparent retardation, which is the product of the apparent total thickness $d_t$ and the apparent total double refraction $n_t$ of the liquid crystal polarizing rotator, need to satisfy the relation indicated by expression (2).

$$\Delta n_t \cdot d_t = \Delta n \cdot d - \Delta n_c \cdot d_c \quad (2)$$
$$= \lambda/2$$

where $\Delta n_c \cdot d_c$ is λ/14 according to the above assumption.

For example, when ZLI-4792 (trademark of MERCK JAPAN Ltd.) with the center wavelength λ of 1550 nm and pre-tilt angle of 1° is used for the liquid crystal material of each liquid crystal cell, Δn is about 0.09. At this time, the λ/14 is about 0.111[μm]. From expression (2), d=9.8[μm]

Therefore, if the liquid crystal polarizing rotator 317 is configured by two polarization control liquid crystal cells, it is understood that the cell thickness $d_1$ of the first liquid crystal cell 301 and the cell thickness $d_2$ of the second crystal cell 303 are at least set as follows:

$d_1 = d_2 = 4.9[μm]$

Consider that the liquid crystal polarizing rotator 317 is operated as a half-wave plate by applying a low bias voltage $V_1$ with $d_1 = d_2 = 5[μm]$. This means that applying the bias voltage minimizes a change in the retardation of liquid crystal cells under control of the bias voltage even if the temperature changes and helps the liquid crystal polarizing rotator 317 to constantly operate as a half-wave plate.

Figure 9:
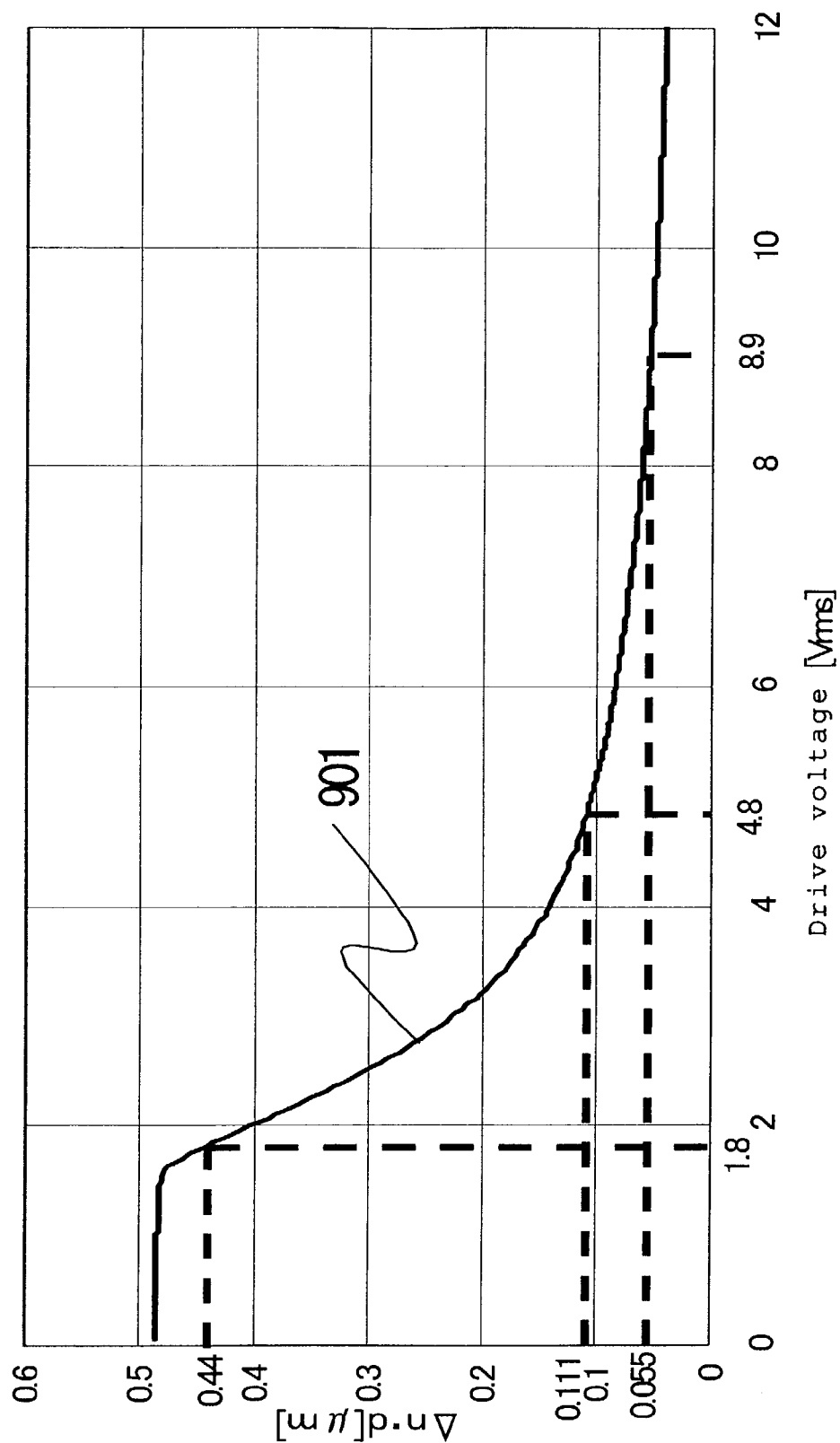
FIG. 9 is a graph showing the drive voltage—retardation characteristics of a liquid crystal cell used for a polarization control liquid crystal optical switch.

Next, the optimum bias voltage to be applied to the polarization control liquid crystal cells and the residual double refraction compensation liquid crystal cell in the configuration described above will be described. FIG. 9 is a graph showing the drive voltage—retardation (Δn·d) characteristics for one liquid crystal cell when the liquid crystal cell is 5 μm thick.

When a low bias voltage $V_1$ is applied to two polarization control liquid crystal cells 301 and 303 with the center wavelength of 1550 nm, the total retardation $\Delta n_t \cdot d_t$ of the liquid crystal polarizing rotator 317 must be set to about 0.78[μm], about half of 1.55[μm]. Therefore, changing expression (2) gives the following:

$$\Delta n \cdot d = \lambda/2 + \Delta n_c \cdot d_c$$
$$= \lambda/2 + \lambda/14$$
$$= 4\lambda/7$$
$$\approx 0.886 [\mu m]$$

As a result, the graph in FIG. 9 indicates that the bias voltage $V_1$ of 1.8[V], where $\Delta n(v_1) \cdot d_1$ is 0.443[µm], should be applied to each of two polarization control liquid crystal cells. Because the assumption is that the retardation of the residual double refraction compensation liquid crystal cell 331 is about 0.111[µm], which is $\lambda/14$, and that the cell thickness $d_c$ is equal to $d_1$ and $d_2$, it is understood from the graph in FIG. 9, that the voltage of 4.8[V] should be constantly applied to the residual double refraction compensation liquid crystal cell 331.

Consider that a low bias voltage of 1.8[V] obtained from FIG. 9 is applied to the polarization control liquid crystal cells 301 and 303 of the liquid crystal polarizing rotator 317 configured as described above. When the incident linearly polarized light 410 with the azimuthal angle of $\beta 1=0$ radian enters where the azimuthal angle is tilted by $-\pi/4$ with respect to the first liquid crystal director 401 in the first interface 309 in FIG. 4A, an outgoing linearly polarized light 413 that exits the surface in the fourth interface 315 in FIG. 4D is a linearly polarized light that vibrates at the azimuthal angle $\beta 2=\pi/2$ radian that is tilted by $+\pi/4$ with respect to the fourth liquid crystal director 407. That is, the liquid crystal polarizing rotator 317 composed of two polarization control liquid crystal cells 301 and 303 (first and second) and the residual double refraction compensation liquid crystal cell 331 functions as a 0th-degree half-wave plate that rotates the incident linearly polarized light 410 by the azimuthal angle of $\pi/2$ to produce the outgoing linearly polarized light 413.

Figure 8:
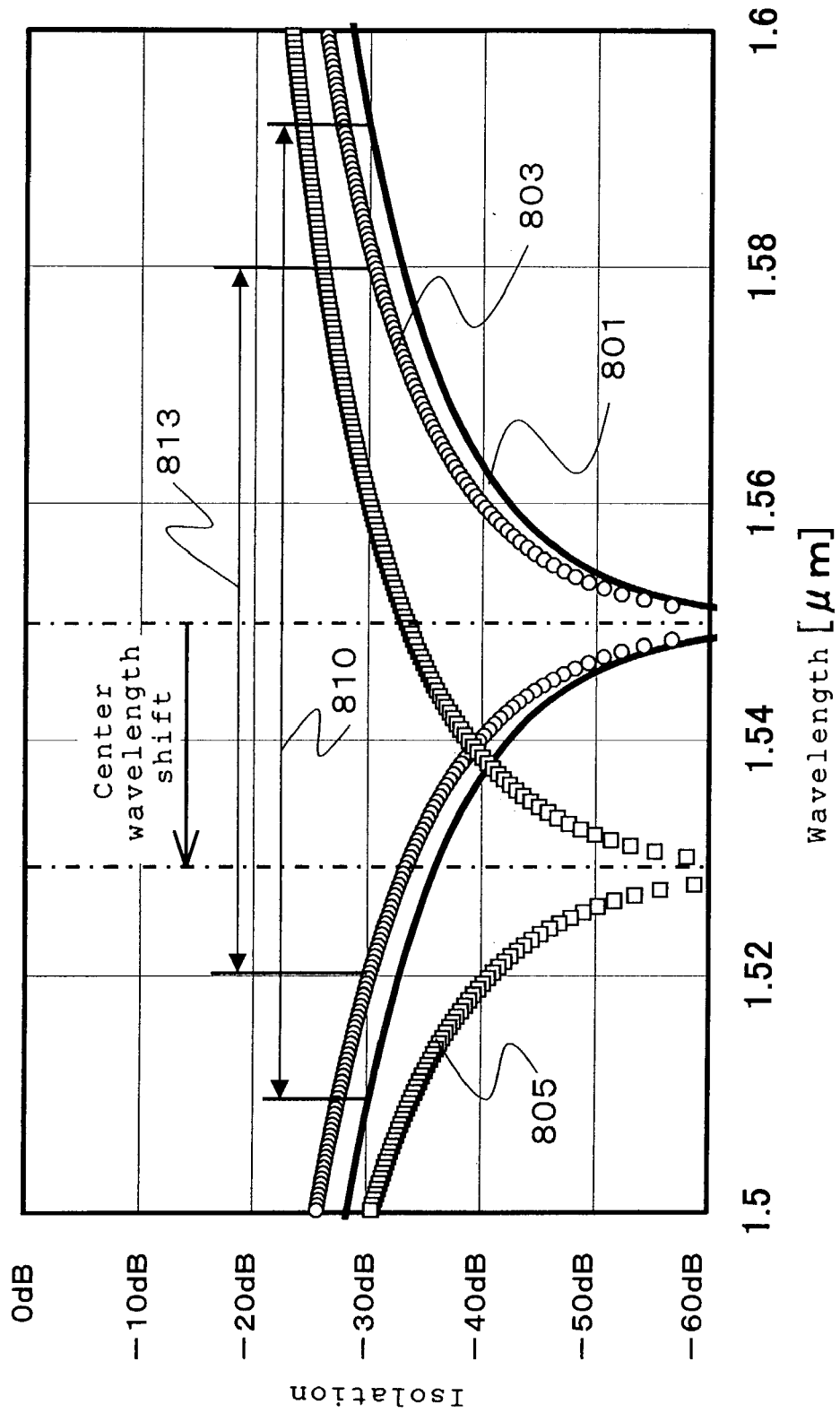
FIG. 8 is a graph showing the comparison in the wavelength dependence of isolation characteristics between a TN type liquid crystal cell and a half-wave plate liquid crystal cell used for the a polarization control liquid crystal optical switch.

Next, the cross-talk attenuation of an optical switch described in the summary of the invention will be described. FIG. 8 is a diagram showing the wavelength dependence of leak light components perpendicular to the outgoing linearly polarized light 413 in FIG. 4. The reference numeral 803 in FIG. 8 indicates the isolation characteristics of the liquid crystal polarizing rotator characteristics when the double refraction plate according to the present invention is fabricated under the 0th-degree half-wave plate condition, and the reference numeral 801 indicates the isolation characteristics of a 90° TN polarizing rotator fabricated under the 1st minimum condition of the prior art.

As described above, if the isolation characteristics function as those of an ideal polarizing rotator when a low bias voltage of 1.8[V] is applied in the configuration of the present invention, all the incident linearly polarized light 410 in FIG. 4A should be converted to the outgoing linearly polarized light 413 in FIG. 4D. However, as the wavelength used fails to meet the half-wave plate condition for a predetermined wavelength, components perpendicular to the outgoing linearly polarized light 413 actually occur and they become the cross-talk components of the optical switch.

The polarizing rotator of the present invention is compared with the polarizing rotator of the prior art in a wavelength range larger than the isolation of −30 dB that is the practical operating wavelength range. The comparison is made at the center wavelength of 1550[nm]. For the characteristics 801 of the 90° TN polarizing rotator of the prior art, a range 810 of −30 dB is about 80[nm]. On the other hand, for the characteristics 803 of the half-wave plate liquid crystal polarizing rotator of the present invention, a range 813 of −30 dB is about 60[nm], meaning that the wavelength range may be reduce to about ¾ of that of the polarizing rotator of the prior art.

In addition, for the half-wave plate liquid crystal polarizing rotator according to the present invention, changing the bias voltage to be applied to the polarization control liquid crystal cells shifts the center wavelength maximizing the cross-talk attenuation. This enables the bandwidth applicable to an optical switch to be greatly extended.

The following shows an example. For example, when the low bias voltage to be applied to the polarization control liquid crystal cells is changed from 1.8[V] to 1.85[V], the characteristics after the bias voltage shift are those indicated by liquid crystal polarizing rotator characteristics 805. This shifts the center wavelength maximizing the cross-talk attenuation from 1550[nm] to 1529[nm]. In addition, the total cell thickness d of the optical switch according to the present invention, which functions as a half-wave plate, is smaller than that of the 90° TN polarizing rotator of the prior art by about $\frac{1}{3}^{1/2}$. This indicates that, especially when a high-speed switch is required, the half-wave plate configuration is suitable. Note that $\frac{1}{3}^{1/2}$ is the coefficient difference between the first condition and the half-wave plate condition.

When a voltage is applied to two polarization control liquid crystal cells, the liquid crystal does not depend on the polarity of the applied voltage. Therefore, any combination of voltage polarity may be used for two polarization control liquid crystal cells. In addition, for the voltage, because the operation is performed based on the total double refraction of two liquid crystal cells, the voltage may be applied to one or two cells and at the same or different level.

If the total double refraction of two liquid crystal cells is the same, the effect of center wavelength shifting may be achieved regardless of a liquid crystal cell to which the voltage is applied, the voltage to be applied, or a combination of voltages. For better controllability, it is desirable that about the same voltage be applied to two cells at the same time.

Next, the actual method for driving the optical switch according to the present invention will be described in detail. First, the operation of the first and second polarization control liquid crystal cells 301 and 303 that is performed when a sufficiently high electric field is applied will be described. Applying a sufficiently high predetermined voltage $V_2$ to the first polarization control liquid crystal cell 301 and second polarization control liquid crystal cell 303 aligns the liquid crystal molecules into the electric field direction and so decreases anisotropy.

FIG. 9 is a graph showing drive voltage—retardation ($\Delta n \cdot d$) characteristics 901 for one liquid crystal cell when the liquid crystal is 5 µm thick. At the center wavelength of 1550 nm, the retardation that is caused when the voltage $V_c$, which gives a double refraction compensation amount at $\frac{1}{14}$ wavelength to the residual double refraction compensation liquid crystal cell 331, is applied is 0.111[µm]. Therefore, each of two polarization control liquid crystal cells requires a correction of 0.055[m]. FIG. 9 shows the voltage of 8.9[V] should be applied as the voltage $V_2$ at this time to the polarization control liquid crystal cells 301 and 303. Therefore, there is no distinction between ordinary light and extraordinary light at this time in the entire liquid crystal polarizing rotator 317 and thus no phase difference is generated due to double refraction. As a result, the incident linearly polarized light 410, if emitted, has the azimuthal angle of 0 radian that is the azimuthal angle at entry time.

In addition, at the drive time, when an electric field is applied to the liquid crystal polarizing rotator 317, a sufficiently high voltage $V_2$ (8.9[V] in the example above) is applied at the same time to the first polarization control liquid crystal cell 301 and the second polarization control liquid crystal cell 303. Also, when a low bias voltage $V_1$ (1.8[V] in the example above) is applied to the liquid crystal polarizing rotator 317, the electric field applied to the first polarization control liquid crystal cell 301 and the second polarization control liquid crystal cell 303 should be removed at the same time. This drive method, if used, allows the liquid crystal polarizing rotator 317 to perform high-speed switching because the switching time is determined by the polarization control liquid crystal cells 301 and 303 between which the thickness is divided.

As is apparent from the above description, a polarization control liquid crystal optical switch using the liquid crystal polarizing rotator according to the present invention does not change, at polarized light rotation time, incident linearly polarized light (low bias voltage of 1.8[V] is applied in this embodiment) into elliptically polarized light after the polarized light rotation to optimize the optical characteristics. At the same time, even at polarized light non-rotation time (electric field applied), the switch does not change incident linearly polarized light into elliptically polarized light but optimizes the optical characteristics and reduces the response time.

In the above description, the configuration is described in which the residual double refraction compensation liquid crystal cell 331 is used for residual double refraction compensation at polarized light non-rotation time of the liquid crystal polarizing rotator 317; instead of the residual double refraction compensation liquid crystal cell 331, a wave plate composed of crystal or anisotropy film having a predetermined retardation may also be used. In this case, the c-axis of the wave plate is placed so that it is perpendicular to the directors of the polarization control liquid crystal cells 301 and 303. In this case, although it is difficult to compensate for residual double refraction, generated in the liquid crystal polarizing rotator 317, over a wide wavelength range, the configuration is applicable as a simply-to-use residual double refraction compensation method depending upon the application.

(First Embodiment)

Figure 1:
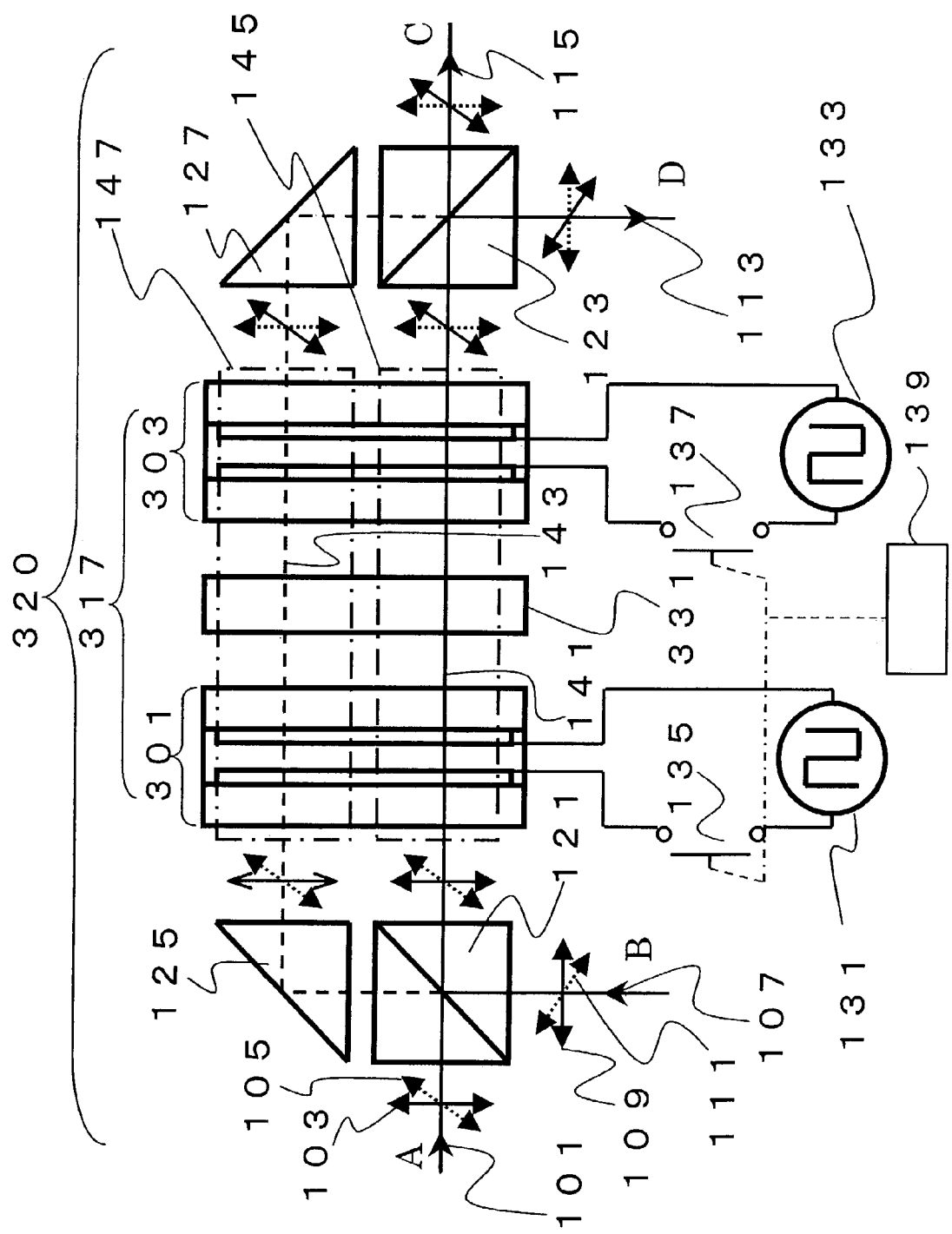
FIG. 1 is a diagram schematically showing the unit configuration of a liquid crystal optical switch that is used as a polarization control liquid crystal optical switch or a variable optical attenuator in a first embodiment and a third embodiment of the present invention.

Next, with reference to FIG. 1, the general configuration of the polarization control liquid crystal optical switch will be described in detail. FIG. 1 schematically shows a polarization control liquid crystal optical switch 320 according to the present invention.

The liquid crystal polarizing rotator 317 comprises a first polarization control liquid crystal cell 301, a second polarization control liquid crystal cell 303, and a residual double refraction compensation liquid crystal cell 331. A first signal source 131 is connected to the first polarization control liquid crystal cell 301 via a first switch 135. Similarly, a second signal source 133 is connected to the second polarization control liquid crystal cell 303 via a second switch 137. The first signal source 131 and the first switch 135 constitute a voltage application unit that applies a predetermined voltage to the first polarization control liquid crystal cell 301. The second signal source 133 and the second switch 137 constitute a voltage application unit that applies a predetermined voltage to the second polarization control liquid crystal cell 303. A controller 139 controls the first switch 135 and the second switch 137 to control a voltage to be applied to the first polarization control liquid crystal cell 301 and the second polarization control liquid crystal cell 303.

For easy understanding, FIG. 1 shows the configuration in which the application of the signal voltage $V_2$ and/or the low bias voltage $V_1$ to the polarization control liquid crystal cells correspond to whether or not the first switch 135 and/or the second switch 137 are on or off. Of course, in the actual switch, the signal source is controlled, not by the switches, but electronically by transistors, diodes, or ICs. In this case, the controller 139 controls, not the switches, but the control circuit controlling the signal source. The controller 139 can also control the control circuit on an analog basis in order to control the voltage to be applied to the first polarization control liquid crystal cell 301 and the second polarization control liquid crystal cell 303 on an analog basis. Although not shown in the figure, an external power source is connected to the residual double refraction compensation liquid crystal cell to constantly apply the voltage $V_c$ to it.

The polarization control liquid crystal optical switch 320 of the present invention is structured such that a first area 145 of a liquid crystal polarizing rotator 317 is provided between a first polarizing splitter 121 and a second polarizing splitter 123. The switch is also structured such that a second area 147 of the liquid crystal polarizing rotator 317 is provided between a first total reflection mirror 125 and a second total reflection mirror 127. The liquid crystal optical switch 320 can be structured as a 2×2 optical switch that has inputs A and B and outputs C and D. The polarizing splitters and the total reflection mirrors need not be provided in the positions shown in FIG. 1; instead, the total reflection mirror 127 may be provided in the light outgoing side of the first area 145, and the second polarizing splitter 123 in the light outgoing side of the second area 147. This configuration makes it possible that the optical paths of light that enters the liquid crystal optical switch 320 of the present invention from input A or B and exits from output C or D are all equal in length.

Next, the operation of the liquid crystal optical switch 320 of the present invention will be described. The operation of the residual double refraction compensation liquid crystal cell 331, which removes residual double refraction components of the polarization control liquid crystal cells 301 and 303, is not essential for the description of the switching characteristics operation. Thus, in the description below, the operation of the residual double refraction compensation liquid crystal cell 331 is omitted.

First, with reference to FIG. 1, the operation will be described in which a low bias voltage $V_1$ is applied to the first polarization control liquid crystal cell 301 and the second polarization control liquid crystal cell 303 of the liquid crystal polarizing rotator 317 and, as a result, the polarized light is rotated by the liquid crystal polarizing rotator 317.

First, consider that first incident light 101 enters from input A. Although not shown explicitly in FIG. 1, the first incident light 101 is light exiting from an optical fiber and changed by a collimator into parallel rays. The first incident light 101 is split by the first polarizing splitter 121 into first linearly polarized light 103 that is p-polarized light and second linearly polarized light 105 that is s-polarized light. The following describes p-polarized light and s-polarized light separately. In the description below, p-polarized light is indicated by a perpendicular or parallel arrow in the figure, and s-polarized light by an oblique arrow.

The first linearly polarized light 103 entering the first polarizing splitter 121, which is p-polarized light, transmits through the first polarizing splitter 121 and travels through the liquid crystal polarizing rotator 317 along a first optical path 141 that passes through the first area 145 of the liquid crystal polarizing rotator 317. Because a low bias voltage $V_1$ is applied to the first polarization control liquid crystal cell 301 and the second polarization control liquid crystal cell 303 of the liquid crystal polarizing rotator 317 and because, though not shown in FIG. 1, the angle between the azimuthal angle of the p-polarized light and the azimuthal angle of the liquid crystal director in the incident side of the first polarization control liquid crystal cell 301 is 45°, the first linearly polarized light 103, whose azimuthal angle is rotated by 90° when output from the first area 145, becomes s-polarized light. The first linearly polarized light 103, which has become s-polarized light, makes a right-angled turn in the second polarizing splitter 123 and exits from output D.

On the other hand, the second linearly polarized light 105 that enters from input A, which is s-polarized light, makes a right-angled turn in the first polarizing splitter 121 and enters the first total reflection mirror 125. In addition, the second linearly polarized light 105 makes a right-angled turn and, still as s-polarized light, propagates through the liquid crystal polarizing rotator 317 along a second optical path 143 in the second area 147 of the liquid crystal polarizing rotator 317. Because the low bias voltage $V_1$ is applied to the first polarization control liquid crystal cell 301 and the second polarization control liquid crystal cell 303 of the liquid crystal polarizing rotator 317 and therefore the liquid crystal polarizing rotator 317 functions as a half-wave plate when the second linearly polarized light 105 exits from the second area 147, the second linearly polarized light 105 has its azimuthal angle rotated by 90° and becomes p-polarized light.

The second linearly polarized light 105 that exits from the second area 147 makes a right-angled turn in the second total reflection mirror 127 and, because it transmits through the second polarizing splitter 123 without changing its direction, reaches output D as p-polarized light. Therefore, first outgoing light 113 produced by combining the first linearly polarized light 103 and the second linearly polarized light 105 exits from output D, wherein the first linearly polarized light 103 is s-polarized light which propagated through the first area 145 and the second linearly polarized light 105 is p-polarized light which propagated through the second area 147. Although not shown, the first outgoing light 113 is sent to an optical fiber via a collimator lens as necessary.

Next, consider second incident light 107 that enters from input B. The second incident light 107 is split by the first polarizing splitter 121 into third linearly polarized light 109 that is p-polarized light and fourth linearly polarized light 111 that is s-polarized light. The following describes p-polarized light and s-polarized light separately.

The third linearly polarized light 109 entering the first polarizing splitter 121, which is p-polarized light, transmits through the first polarizing splitter 121, makes a right-angled turn in the first total reflection mirror 125, and travels through the liquid crystal polarizing rotator 317 along the second optical path 143 that passes through the second area 147 of the liquid crystal polarizing rotator 317. Because the low bias voltage $V_1$ is applied to the first polarization control liquid crystal cell 301 and the second polarization control liquid crystal cell 303 of the liquid crystal polarizing rotator 317 and because, though not shown in FIG. 1, the angle between the azimuthal angle of the p-polarized light and the azimuthal angle of the liquid crystal director in the incident side of the first polarization control liquid crystal cell 301 is 45°, the third linearly polarized light 109, whose azimuthal angle is rotated by 90° when output from the second area 147, becomes s-polarized light. The third linearly polarized light 109, which has become s-polarized light, makes a right-angled turn in the second total reflection mirror 127 and enters the second polarizing splitter 123. However, because the third linearly polarized light 109 is s-polarized light, it makes a right-angled turn in the second polarizing splitter 123 and exits from output C.

On the other hand, the fourth linearly polarized light 111 that enters from input B, which is s-polarized light, makes a right-angled turn in the first polarizing splitter 121 and, still as s-polarized light, propagates through the liquid crystal polarizing rotator 317 along the first optical path 141 that passes through the first area 145 of the liquid crystal polarizing rotator 317.

Because the low bias voltage $V_1$ is applied to the first polarization control liquid crystal cell 301 and the second polarization control liquid crystal cell 303 of the liquid crystal polarizing rotator 317 and therefore the liquid crystal polarizing rotator 317 functions as a half-wave plate, the fourth linearly polarized light 111 has its azimuthal angle rotated by 90° when it exits from the first area 145 and becomes p-polarized light. The fourth linearly polarized light 111 that exits from the first area 145 transmits through the second polarizing splitter 123 without changing the direction and reaches output C as p-polarized light.

Therefore, second outgoing light 115 produced by combining the third linearly polarized light 109 and the fourth linearly polarized light 111 exits from output C, wherein the third linearly polarized light 109 is s-polarized light which propagated through the second area 147 and the fourth linearly polarized light 111 is p-polarized light which propagated through the first area 145. Although not shown, the second outgoing light 115 is sent to an optical fiber via a collimator lens as necessary.

Next, the operation will be described when the first switch 135 of the first signal source 131 and the second switch 137 of the second signal source 133 in FIG. 1 are turned on to apply a sufficiently high voltage $V_2$ (drive voltage) to the first polarization control liquid crystal cell 301 and the second polarization control liquid crystal cell 303 of the liquid crystal polarizing rotator 317. This prevents the liquid crystal polarizing rotator 317 from performing polarization rotation.

First, consider that first incident light 101 enters from input A. The first incident light 101 is split by the first polarizing splitter 121 into first linearly polarized light 103 that is p-polarized light and second linearly polarized light 105 that is s-polarized light. The following describes p-polarized light and s-polarized light separately.

The first linearly polarized light 103 entering the first polarizing splitter 121, which is p-polarized light, transmits through the first polarizing splitter 121 and travels through the liquid crystal polarizing rotator 317 along the first optical path 141 that passes through the first area 145 of the liquid crystal polarizing rotator 317. Because the drive voltage $V_2$ is applied to the first polarization control liquid crystal cell 301 and the second polarization control liquid crystal cell 303 of the liquid crystal polarizing rotator 317 and therefore the liquid crystal polarizing rotator 317 does not rotate the azimuthal angle, the first linearly polarized light 103 is still p-polarized light when it exits from the first area 145. Therefore, the first linearly polarized light 103 transmits the second polarizing splitter 123 without changing its direction and exits from output C.

On the other hand, the second linearly polarized light 105 that enters from input A, which is s-polarized light, makes a right-angled turn in the first polarizing splitter 121 and enters the first total reflection mirror 125. In addition, the second linearly polarized light 105 makes a right-angled turn and, still as s-polarized light, propagates through the liquid crystal polarizing rotator 317 along the second optical path 143 in the second area 147 of the liquid crystal polarizing rotator 317.

Because the drive voltage $V_2$ is applied to the first polarization control liquid crystal cell 301 and the second polarization control liquid crystal cell 303 of the liquid crystal polarizing rotator 317, the second linearly polarized light 105 is still s-polarized light with the polarization state unchanged when it exits from the second area 147. Therefore, the second linearly polarized light 105 exiting from the second area 147 makes a right-angled turn in the second total reflection mirror 127, makes another right-angled turn in the second polarizing splitter 123, and reaches output C still as s-polarized light. Therefore, second outgoing light 115 produced by combining the first linearly polarized light 103 and the second linearly polarized light 105 exits from output C, wherein the first linearly polarized light 103 is p-polarized light which propagated through the first area 145 and the second linearly polarized light 105 is s-polarized light which propagated through the second area 147. Although not shown, the second outgoing light 115 is sent to an optical fiber via a collimator lens as necessary.

Next, consider second incident light 107 that enters from input B. The second incident light 107 is split by the first polarizing splitter 121 into third linearly polarized light 109 that is p-polarized light and fourth linearly polarized light 111 that is s-polarized light.

The third linearly polarized light 109 entering the first polarizing splitter 121, which is p-polarized light, transmits through the first polarizing splitter 121, makes a right-angled turn in the first total reflection mirror 125, and travels through the liquid crystal polarizing rotator 317 along the second optical path 143 that passes through the second area 147 of the liquid crystal polarizing rotator 317.

Because the drive voltage $V_2$ is applied to the first polarization control liquid crystal cell 301 and the second polarization control liquid crystal cell 303 of the liquid crystal polarizing rotator 317 and therefore the polarization rotation function is inactive, the third linearly polarized light 109 is still p-polarized light when it exits from the second area 147. The third linearly polarized light 109 that exits from the second area 147 makes a right-angled turn in the second total reflection mirror 127 and then enters the second polarizing splitter 123. However, because the third linearly polarized light 109 is p-polarized light, it transmits through the second polarizing splitter 123 without changing the direction and exits from output D.

On the other hand, the fourth linearly polarized light 111 that enters from input B, which is s-polarized light, makes a right-angled turn in the first polarizing splitter 121 and, still as s-polarized light, propagates through the liquid crystal polarizing rotator 317 along the first optical path 141 that passes through the first area 145 of the liquid crystal polarizing rotator 317. Because the drive voltage $V_2$ is applied to the first polarization control liquid crystal cell 301 and the second polarization control liquid crystal cell 303 of the liquid crystal polarizing rotator 317 and therefore the polarization rotation function is inactive, the fourth linearly polarized light 111 is still s-polarized light when it exits from the first area 145. The fourth linearly polarized light 111 that exits from the first area 145 makes a right-angled turn in the second polarizing splitter 123 and reaches output D as s-polarized light. Therefore, first outgoing light 113 produced by combining the third linearly polarized light 109 and the fourth linearly polarized light 111 exits from output D, wherein the third linearly polarized light 109 is p-polarized light which propagated through the second area 147 and the fourth linearly polarized light 111 is s-polarized light which propagated through the first area 145. Although not shown, the first outgoing light 113 is sent to an optical fiber via a collimator lens as necessary.

As is apparent from the above description, when the low bias voltage $V_1$ is applied to the first polarization control liquid crystal cell 301 and the second polarization control liquid crystal cell 303 of the liquid crystal polarizing rotator 317, the first incident light 101 that enters from input A exits from output D as the first outgoing light 113. When the drive voltage $V_2$ is applied to the first polarization control liquid crystal cell 301 and the second polarization control liquid crystal cell 303 of the liquid crystal polarizing rotator 317 and therefore the polarization rotation function is inactive, the first incident light 101 that enters from input A exits from output C as the second outgoing light 115. That is, the first incident light 101 exits from different outputs, output C or output D, depending upon the voltage, $v_1$ or $v_2$, that is applied to the polarization control liquid crystal cells 301 and 303.

When the low bias voltage $V_1$ is applied to the first polarization control liquid crystal cell 301 and the second polarization control liquid crystal cell 303 of the liquid crystal polarizing rotator 317, the second incident light 107 that enters from input B exits from output C as the second outgoing light 115. When the drive voltage $V_2$ is applied to the first polarization control liquid crystal cell 301 and the second polarization control liquid crystal cell 303 of the liquid crystal polarizing rotator 317 and therefore the polarization rotation function is inactive, the second incident light 107 that enters from input B exits from output C as the second outgoing light 115. That is, the first incident light 101 exits from different outputs, output D or output C, depending upon the voltage, $v_1$ or $v_2$, that is applied to the polarization control liquid crystal cells 301 and 303.

From the description above, it is apparent that the liquid crystal optical switch 320 according to the present invention operates as a 2×2 optical switch. Also, it is easily understood that, if one of the first incident light 101 and the second incident light 107 shown in FIG. 1 is used, the liquid crystal optical switch 320 may be used as a 1×2 optical switch.

(Second Embodiment)

Figure 7:
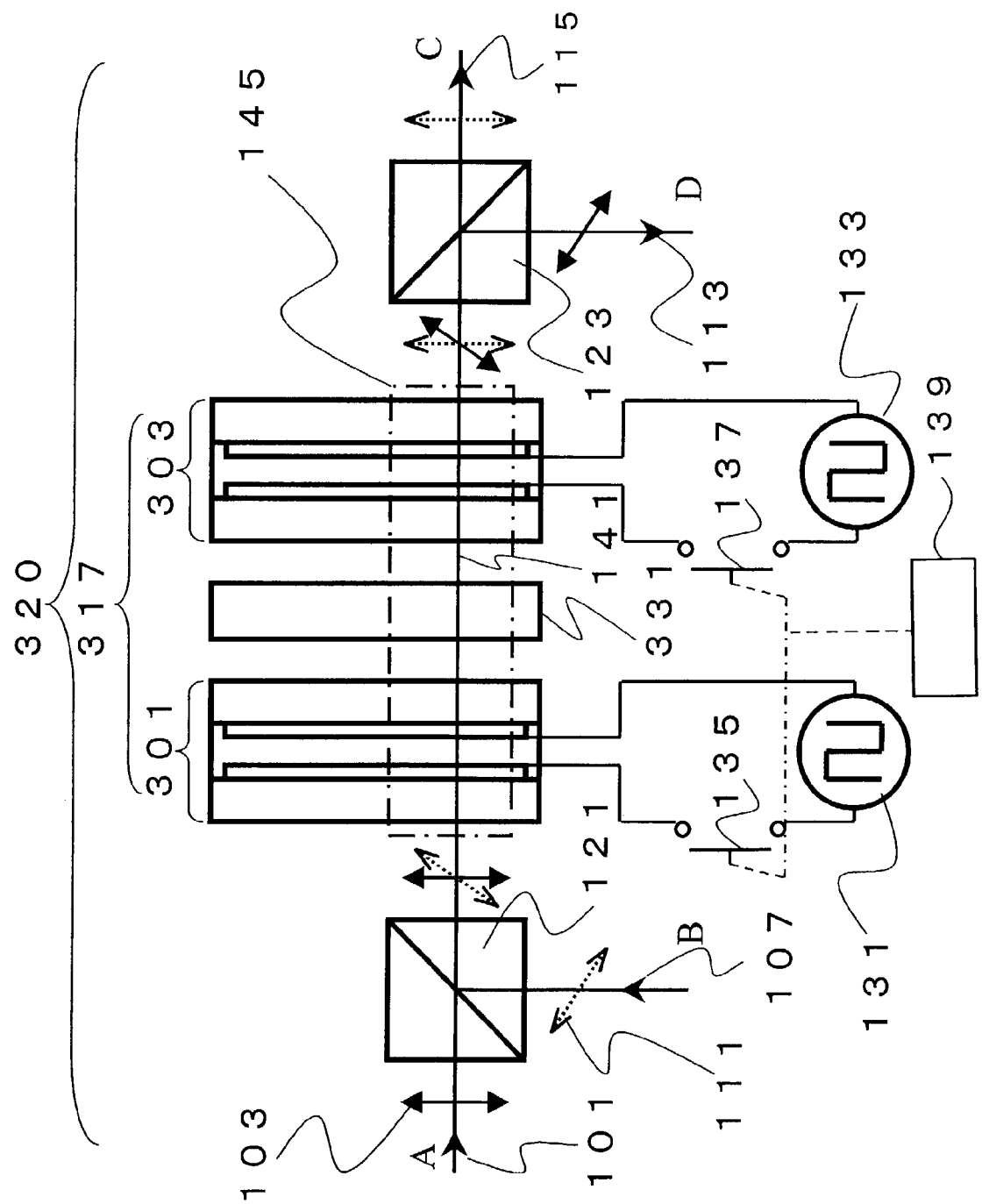
FIG. 7 is a cross sectional diagram schematically showing the configuration of a polarization control liquid crystal optical switch in a second embodiment of the present invention in which incident light is limited to linearly polarized light.

The following describes the operation executed when light that enters a liquid crystal optical switch 320 according to the present invention is linearly polarized light from the beginning. First, with reference to FIG. 7, the operation will be described in which a liquid crystal polarizing rotator 317 rotates polarized light by applying a low bias voltage $V_1$ to a first polarization control liquid crystal cell 301 and a second polarization control liquid crystal cell 303 of the liquid crystal polarizing rotator 317. In FIG. 7, like reference numerals in FIG. 1 are used to indicate like components. First, consider that first incident light 101 enters from input A. Although not shown explicitly in FIG. 7, the first incident light 101 and second incident light 107, which will be described later, may be parallel rays generated by a collimator by converting light exiting from a polarization-maintaining optical fiber. The first incident light 101 is assumed to be a polarized light component consisting only of the first linearly polarized light 103 that is p-polarized light with respect to a first polarizing splitter 121.

The first linearly polarized light 103 that enters a first polarizing splitter 121, which is p-polarized light, transmits through the first polarizing splitter 121 and travels through the liquid crystal polarizing rotator 317 along a first optical path 141 passing through a first area 145 of the liquid crystal polarizing rotator 317. Because a low bias voltage $V_1$ is applied to the first polarization control liquid crystal cell 301 and the second polarization control liquid crystal cell 303 of the liquid crystal polarizing rotator 317 and because, though not shown in FIG. 7, the angle between the azimuthal angle of the p-polarized light and the azimuthal angle of the liquid crystal director in the incident side of the first polarization control liquid crystal cell 301 is 45°, the first linearly polarized light 103 has its azimuthal angle rotated 90° when it exits from the first area 145 and becomes s-polarized light. The first linearly polarized light 103, which is the first incident light 101 and which has become s-polarized light, makes a right-angled turn in a second polarizing splitter 123 and exits from output D as first outgoing light 113. Although not shown, the first outgoing light 113 is connected to an optical fiber via a collimator lens as necessary.

Next, consider second incident light 107 that enters from input B. The second incident light 107 is assumed to be fourth linearly polarized light 111 with an azimuthal angle that is S-polarized light with respect to the first polarizing splitter 121. Because the fourth linearly polarized light 111, which enters from input B, is s-polarized light, it makes a right-angled turn in the first polarizing splitter 121 and, still as s-polarized light, propagates through the liquid crystal polarizing rotator 317 along the first optical path 141 passing through the first area 145 of the liquid crystal polarizing rotator 317.

Because the low bias voltage $V_1$ is applied to the first polarization control liquid crystal cell 301 and the second polarization control liquid crystal cell 303 of the liquid crystal polarizing rotator 317 and therefore the liquid crystal polarizing rotator 317 functions as a half-wave plate when the fourth linearly polarized light 111 exits from the first area 145, the fourth linearly polarized light 111 has its azimuthal angle rotated 90° and becomes p-polarized light. The fourth linearly polarized light 111, which is the second incident light 107 exiting from the first area 145, transmits through the second polarizing splitter 123 without changing the direction and reaches output C as p-polarized light. Therefore, the fourth linearly polarized light 111 exits from output C as second outgoing light 115. Although not shown, the second outgoing light 115 is connected to an optical fiber via a collimator lens as necessary.

Now, consider that a first signal source 131 and a second signal source 133 are connected, respectively, to the first polarization control liquid crystal cell 301 and the second polarization control liquid crystal cell 303 of the liquid crystal polarizing rotator 317 and that a first switch 135 and a second switch 137 are turned on to apply a predetermined drive voltage $V_2$ to the liquid crystal cells. In this case, the liquid crystal polarizing rotator 317 does not perform 90° rotation of the azimuthal angle of incident polarized light. Therefore, the first incident light 101 exits from output C as the second outgoing light 115, and the second incident light 107 exits from output D as the first outgoing light 113.

From the description above, it is apparent that the liquid crystal optical switch 320 according to the present invention operates as a 2×2 optical switch that allows the output destination to be selected by switching the voltage to be applied to the liquid crystal polarizing rotator 317 between the drive voltage $V_2$ and the low bias voltage $V_1$. Also, it is easily understood that the liquid crystal optical switch 320 may be used as a 1×2 optical switch if the first polarizing splitter 121 shown in FIG. 7 is not used and if one of the first incident light 101 and the second incident light 107 shown in FIG. 7, which is p-polarized light or s-polarized light, enters the first area 145.

(Third Embodiment)

Next, the configuration of the polarization control liquid crystal optical switch 320 of the present invention that is used as a variable optical attenuator, as well as its drive method, will be described. The liquid crystal polarizing rotator in this configuration is similar to the first embodiment except only for the configuration and the drive method of a first switch 135 and a second switch 137. An example will be described below.

For example, in FIG. 1, assume that only first incident light 101 enters from input A and that only first outgoing light 113 exits from output D. Then, the first switch 135 and the second switch 137 are turned on to connect a first signal source 131 to a first polarization control liquid crystal cell 301 and to connect a second signal source 133 to the second polarization control liquid crystal cell 303. At this time, the effective voltage to be applied to the polarization control liquid crystal cells 301 and 303 for polarization control is changed on an analog basis, for example, by changing the amplitude or the pulse width of the output from the first signal source 131 and the second signal source 133.

In this case, light exiting from the first area 145 and the second area 147 of the liquid crystal polarizing rotator 317 becomes, in general, elliptically polarized light because the polarization rotation function becomes inactive on an analog basis according to the voltage that is applied in order to modulate the polarization control liquid crystal cells 301 and 303 of the liquid crystal polarizing rotator 317. Therefore, the first outgoing light 113 exiting from output D is subject to the modulation intensity, and thus the output light intensity may be continuously controlled arbitrarily according to the effective value of output from the first signal source 131 and the second signal source 133. Accordingly, the configuration of this embodiment enables the polarization control liquid crystal optical switch 320 to be used as a variable optical attenuator.

(Fourth Embodiment)

Figure 6:
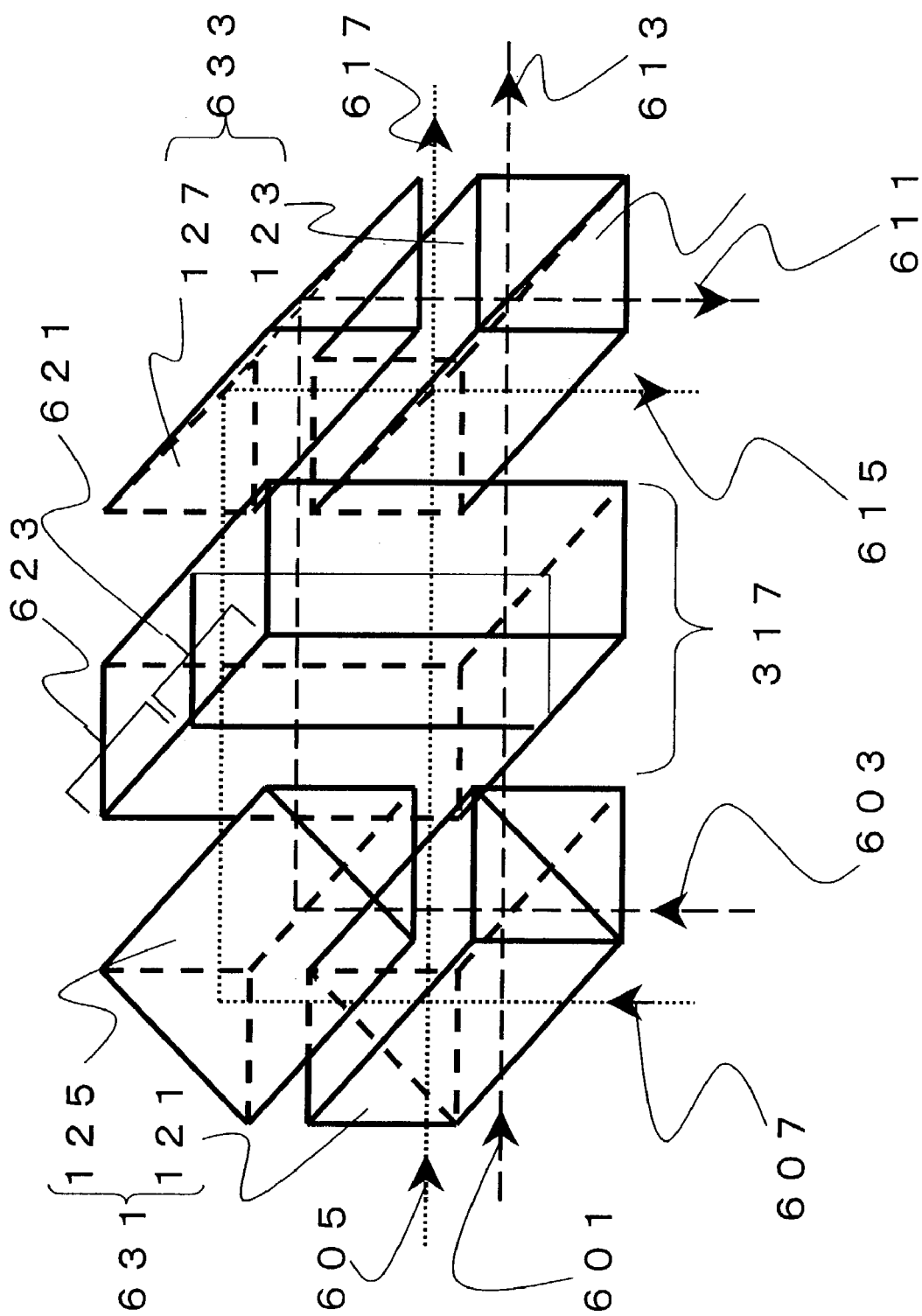
FIG. 6 is a diagram schematically showing the configuration of a polarization control liquid crystal optical switch formed into an array in a fourth embodiment of the present invention.

Next, with reference to FIG. 6, the following describes the configuration in which a polarization control optical switch using liquid crystal cells according to the present invention is formed into an array. FIG. 6 is a diagram showing the configuration of a polarization control liquid crystal optical switch that uses a liquid crystal cell formed into an array. When the optical switch is formed into an array, a liquid crystal polarizing rotator 317 composed of a plurality of cells is divided into array elements in the dimension. Although the division method is not shown in FIG. 6, the array is configured by dividing the transparent electrode of the polarization control liquid crystal cells of the liquid crystal polarizing rotator 317 into a predetermined number of areas in the electrode dimension to configure a plurality of liquid crystal polarizing rotator elements and by arbitrarily controlling each of the plurality of liquid crystal polarizing rotators. FIG. 6 shows the liquid crystal polarizing rotator 317 that is divided into two: a first liquid crystal polarizing rotator element 621 and a second liquid crystal polarizing rotator element 623.

As shown in FIG. 6, a first compound prism 631 comprises a first polarizing splitter 121 and a first total reflection mirror 125, and a second compound prism 633 comprises a second polarizing splitter 123 and a second total reflection mirror 127. An array-type polarization control optical switch is configured by placing the liquid crystal polarizing rotator 317, which has a plurality of divided liquid crystal polarizing rotator elements as described above, between the first compound prism 631 and the second compound prism 633. FIG. 6 shows two array elements each of which is a 2×2 element. The first liquid crystal polarizing rotator element 621 controls incident light from an input 601 (1A) and an input 603 (1B) and allows outgoing light to exit from an output 611 (1C) and an output 613 (1D). The second liquid crystal polarizing rotator element 623 controls incident light from an input 605 (2A) and an input 607 (2B) and allows outgoing light to exit from an output 615 (2C) and an output 617 (2D)

Although a one-dimensional, two-element array, created by dividing the liquid crystal polarizing rotator 317 into two, is indicated in FIG. 6 for the sake of simplicity, it is easily understood that an array-type optical switch is not limited to a one-dimensional, two-element array because the switch may be created in two dimensions using the method described above.

As is apparent from the above description, the liquid crystal optical switch according to the present invention may be used to implement a highly functional, simply structured optical switch that may also be used as a variable optical attenuator.

That is, the polarization control liquid crystal optical switch using the liquid crystal polarizing rotator according to the present invention prevents incident linearly polarized light from being changed into elliptically polarized light at polarization rotation time and optimizes the optical characteristics At the same time, the optical switch prevents incident linearly polarized light from being changed into elliptically polarized light even at polarization non-rotation time, optimizes the optical characteristics, and reduces the response time.

In addition, the configuration of the present invention reduces the cross-talk attenuation of an optical switch, changes the wavelength used as the half-wave plate condition under control of the voltage that is applied, and greatly reduces the cross-talk attenuation at a predetermined wavelength of light that enters the liquid crystal polarizing rotator. Therefore, optimally designing the half-wave plate condition according to the wavelength expands the apparent available bandwidth of an optical switch.

The invention claimed is:

1. A liquid crystal optical switch, comprising:
   a liquid crystal polarizing rotator including at least one polarization control liquid crystal cell,
   wherein, at polarization rotation operation time, said liquid crystal polarizing rotator acts as a half-wave plate for linearly polarized light with a predetermined wavelength which enters said liquid crystal polarizing rotator, and
   wherein said polarization control liquid crystal cell has a function that varies a center wavelength to be used when said polarization control liquid crystal cell acts as the half-wave plate, and
   a function that maximizes a cross-talk attenuation.

2. The liquid crystal optical switch according to claim 1, wherein said polarization control liquid crystal cell is a cell in which a liquid crystal layer held between a pair of plates is in either anti-parallel or parallel orientation.

3. The liquid crystal optical switch according to claim 1, wherein said liquid crystal polarizing rotator comprises:
   at least one polarization control liquid crystal cell; and
   at least one residual double refraction compensation means placed in an optical path passing through said polarization control liquid crystal cell to maximize the cross-talk attenuation.

4. The liquid crystal optical switch according to claim 3, wherein said residual double refraction compensation means is a residual double refraction compensation liquid crystal cell in which a liquid crystal layer held between a pair of plates is in either anti-parallel or parallel orientation and
   wherein an azimuthal angle of a liquid crystal director of said residual double refraction compensation liquid crystal cell is almost perpendicular to an azimuthal angle of a liquid crystal director of said polarization control liquid crystal cell.

5. The liquid crystal optical switch according to claim 3, wherein said residual double refraction compensation means is a residual double refraction compensation wave plate made of a crystal plate or an anisotropy film and wherein a c-axis of the residual double refraction compensation wave plate is perpendicular to a director of said polarization control liquid crystal cell.

6. An optical liquid crystal switch comprising:
   a liquid crystal polarizing rotator including at least one polarization control liquid crystal cell;
   a voltage application unit applying a voltage to said polarization control liquid crystal cell; and
   a controller controlling a voltage to be applied,
   wherein said controller controls the voltage to be applied to the polarization control liquid crystal cell to change a retardation of said liquid crystal polarizing rotator for rotating a polarization of light with a predetermined wavelength that enters the liquid crystal polarizing rotator, and said controller controls the voltage applied to said polarization control liquid crystal cell to shift a center wavelength of said polarization control liquid crystal cell.

7. The optical liquid crystal switch according to claim 6, wherein said controller applies the voltage so that the retardation satisfies a half-wave plate condition for operating said liquid crystal polarizing rotator as a half-wave plate.

8. The optical liquid crystal switch according to claim 7, wherein said controller varies the center wavelength by shifting the voltage at which the retardation satisfies the half-wave plate condition.

9. The optical liquid crystal switch according to claim 7, wherein said controller applies the voltage at which the retardation satisfies the half-wave plate condition for maximizing a cross talk attenuation of linearly polarized light passing through said liquid crystal polarizing rotator.

* * * * *